United States Patent
Miyajima et al.

(10) Patent No.: US 7,584,218 B2
(45) Date of Patent: Sep. 1, 2009

(54) METHOD AND APPARATUS FOR ATTACHING METADATA

(75) Inventors: Yasushi Miyajima, Kanagawa (JP); Kosei Yamashita, Kanagawa (JP); Motoyuki Takai, Tokyo (JP); Akihiro Komori, Tokyo (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 11/683,119

(22) Filed: Mar. 7, 2007

(65) Prior Publication Data

US 2007/0255739 A1 Nov. 1, 2007

(30) Foreign Application Priority Data

Mar. 16, 2006 (JP) ............................ 2006-073185

(51) Int. Cl.
*G06F 17/301* (2006.01)
(52) U.S. Cl. .................................................. 707/104.1
(58) Field of Classification Search ...................... 707/2, 707/101, 104.1; 84/636
See application file for complete search history.

(56) References Cited

U.S. PATENT DOCUMENTS

| 6,307,141 B1 | 10/2001 | Laroche et al. |
| 2002/0148347 A1* | 10/2002 | Herberger et al. ............. 84/636 |
| 2004/0159221 A1 | 8/2004 | Camiel |
| 2004/0200336 A1 | 10/2004 | Senoo et al. |
| 2005/0211072 A1 | 9/2005 | Lu et al. |

FOREIGN PATENT DOCUMENTS

| EP | 1 031 363 A2 | 8/2000 |
| JP | 0366528 | 5/2000 |
| JP | 3066528 | 5/2000 |
| JP | 2002-116754 | 4/2002 |
| WO | WO 2007/004540 A1 | 1/2007 |

* cited by examiner

*Primary Examiner*—Etienne P LeRoux
(74) *Attorney, Agent, or Firm*—Oblon, Spivak, McClelland, Maier & Neustadt, P.C.

(57) ABSTRACT

A method for attaching metadata includes steps of specifying at least two positions in head portions of bars of music data of music, and segmenting into segments a duration extending between the specified two positions and attaching time-series metadata to the segments.

13 Claims, 20 Drawing Sheets

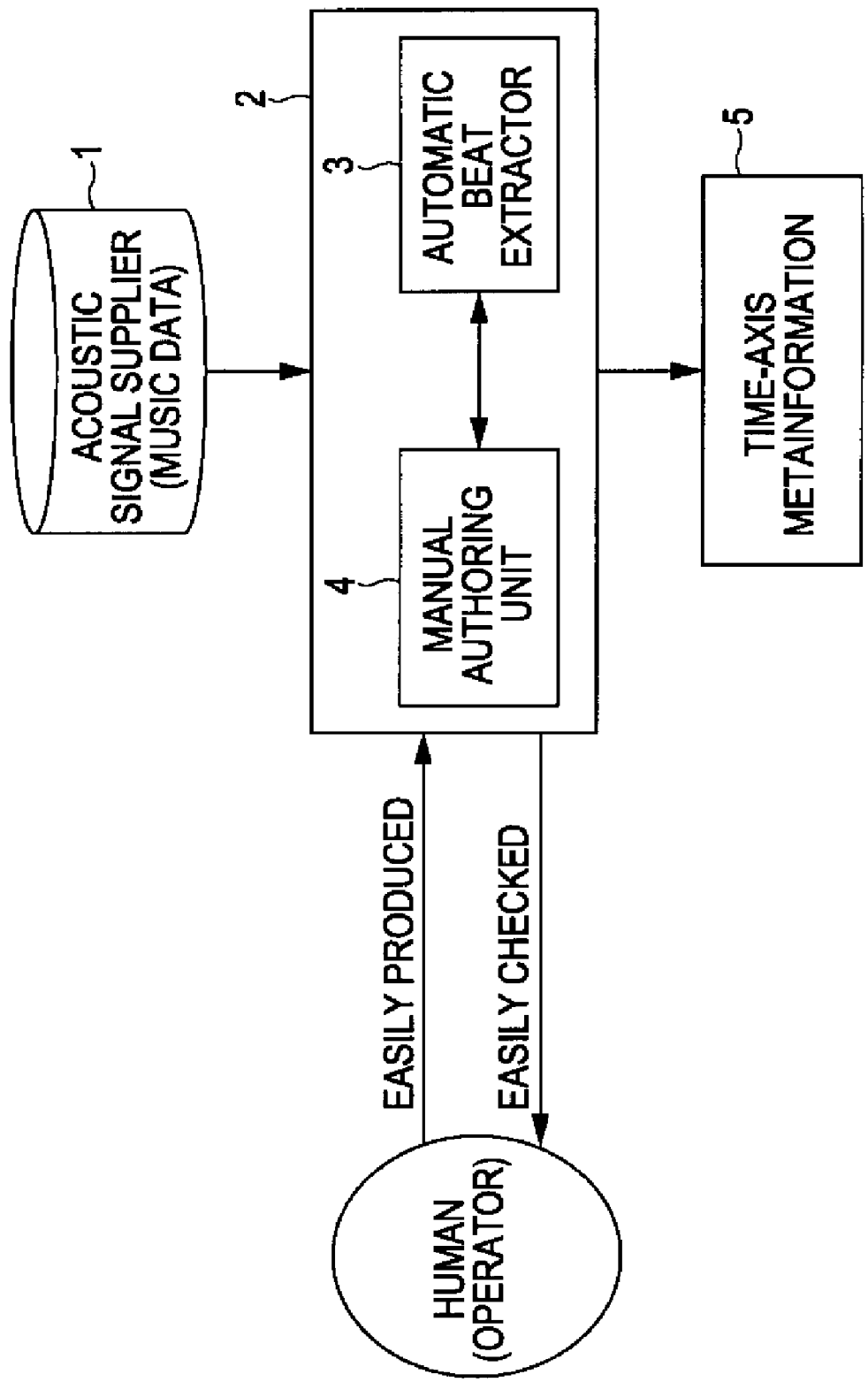

TIME-SERIES WAVEFORM

SPECTROGRAM

TIME-SERIES WAVEFORM

SPECTROGRAM

EXTRACTED BEAT WAVEFORM

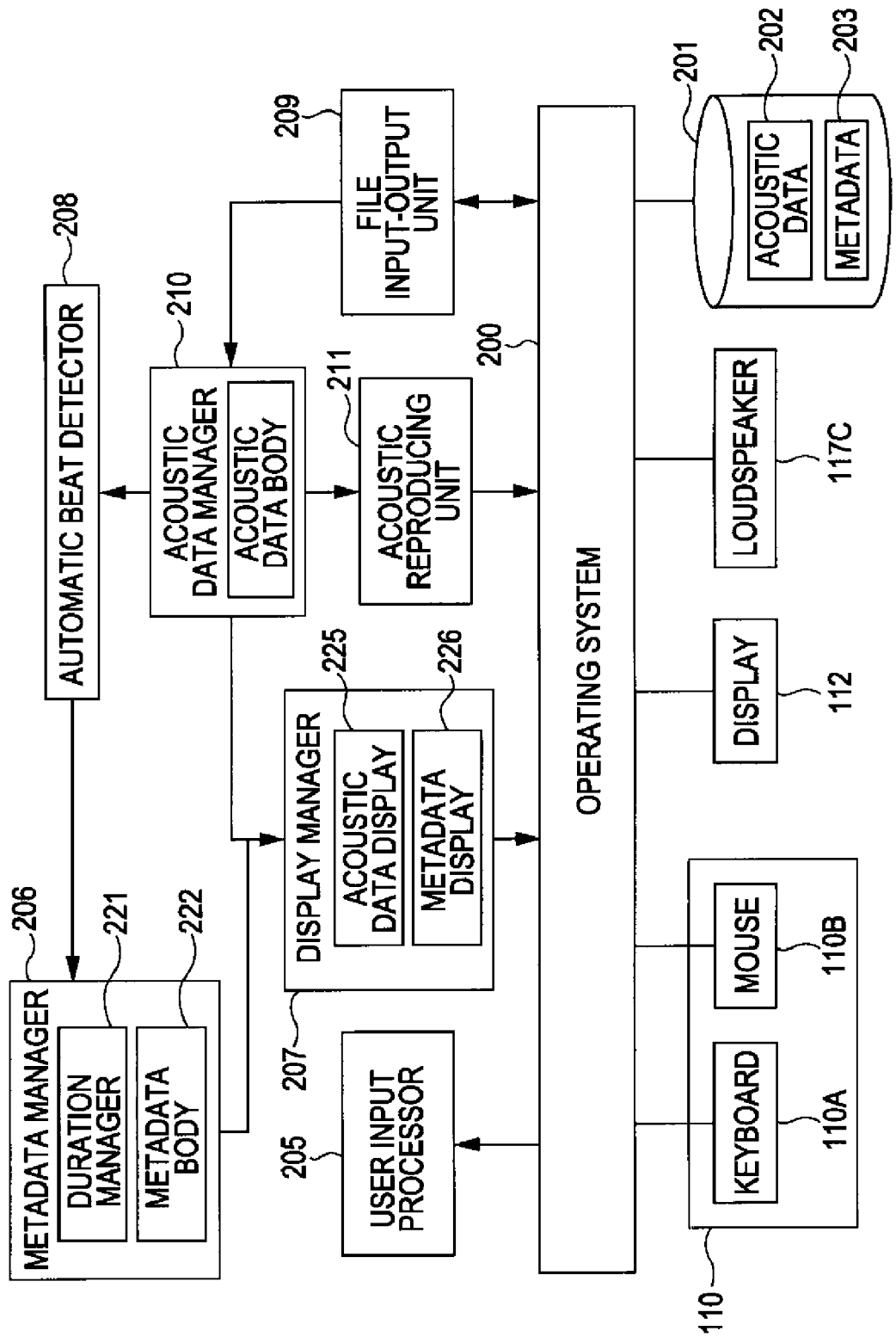

FIG. 24

| START SAMPLE |
| END SAMPLE |
| DURATION BPM |
| BEAT IN DURATION |
| NUMBER OF BARS IN DURATION |
| DURATION BAR LENGTH (VALUE ADJUSTED SO THAT AN INTEGER NUMBER OF BARS FALLS WITHIN DURATION) |

METHOD AND APPARATUS FOR ATTACHING METADATA

CROSS REFERENCES TO RELATED APPLICATIONS

The present invention contains subject matter related to Japanese Patent Application JP 2006-073185 filed in the Japanese Patent Office on Mar. 16, 2006, the entire contents of which are incorporated herein by reference.

BACKGROUND OF THE INVENTION

1. Field of the Invention

The present invention relates to a method and apparatus for attaching time series music metadata.

2. Description of the Related Art

Audio reproducing apparatuses employing a large-capacity storage medium such as a semiconductor memory or a hard disk are currently in widespread use. More and more users are now storing and enjoying a vast amount of music data stored on not only an audio reproducing apparatus but also on a storage unit in an information device such as a personal computer or a cellular phone. Albums may be managed on removable recording media such as a compact disk (CD) or tape on a per medium basis, while a vast amount of music data for several hundreds to tens of thousands of songs can be handled on a single device.

Random accessing to a large amount of songs is possible without replacing a medium, and users can produce a playlist of songs across albums. Metadata attaching service system currently draws attention to efficiently search for a song among numerous songs and to group songs. The metadata attaching service system acquires music metadata, such as song title, artist name, album name, etc. from a database and then attaches the music metadata to music data. The metadata attaching service system acquires not only song titles, and artist names but also genre of each song and to some degree, tempo information.

The metadata attaching service system is basically developed to search for songs and to group songs, and actually used for searching and grouping purposes. The manner of listening to a song reproduced as a result of search remains unchanged from the known manner.

Tools are available for professional or semi-professional music creators who may compose and arrange songs. Such tools manage the tempo and beat position of a song in time axis, and edit music data with reference to the position. Similarly, some of available disk jockey software programs store position information of beats to superimpose a plurality of songs in synchronization with the beat.

Information regarding such beats is based on the premise that tempo remains unchanged throughout one song. In commercially available recorded content, tempo typically fluctuates in several localized portions of each song, and it is usually difficult to keep track of accurate beat positions.

If an apparatus automatically recognizes timing of bars and beats of music from live music waveforms, metadata of the beat position is acquired from a vast amount of music content recorded on an existing CD, and possibility is opened to a new entertainment.

Attempts have been made to automatically extract temp or beat.

For example, Japanese Unexamined Patent Application Publication No. 2002-116754 discloses one extraction method. In accordance with the disclosed method, autocorrelation of a music waveform signal is calculated as a time-series signal, beat structure of music is analyzed based on the calculated autocorrelation, and the tempo of the music is then extracted from the resulting beat structure.

In accordance with Japanese Patent No. 3066528, sound pressure data of each of a plurality of frequency bands is produced from music data, a frequency band that predominantly provides rhythm is identified from the plurality of frequency bands, and a rhythm component is then estimated from a variation period in the pressure data of the identified frequency band.

SUMMARY OF THE INVENTION

Techniques for automatically extracting rhythm, beat, and tempo are divided into two types. In one type, a music signal is analyzed in time domain as disclosed in Japanese Unexamined Patent Application Publication No. 2002-116754, and in the other type, a music signal is analyzed in frequency domain as disclosed in Japanese Patent No. 3066528.

If the music signal is analyzed in the time domain, the beat and the time-series waveform do not match each other accurately, and high accuracy is not achieved in extraction process. If the music signal is analyzed in the frequency domain, extraction accuracy is relatively easily improved. But data resulting from the frequency analysis contains many beats other than beats of a particular musical note. It is extremely difficult to identify the beat of each musical note from all beats. Since musical tempo fluctuates greatly, extracting the beat of a particular musical note keeping track of the musical tempo fluctuation is extremely difficult.

It is thus desirable to provide a metadata attaching method and a metadata attaching apparatus for easily and accurately attaching time-series metadata, such as beat position and bar, to music data.

In accordance with one embodiment of the present invention, a method for attaching metadata, includes steps of specifying at least two positions in head portions of bars of music data of music, and segmenting into segments a duration extending between the specified two positions and attaching time-series metadata to the segments.

At least one of the two positions in the head portion of the bar may be manually specified by a listener who is listening to the music.

The time-series metadata may be calculated by dividing the duration extending between the two specified positions by one of the length of the bar and the number of bars.

In accordance with embodiments of the present invention, the beat position in music rhythm or the head position of each bar are accurately extracted from music data.

BRIEF DESCRIPTION OF THE DRAWINGS

FIG. 1 is a block diagram diagrammatically illustrating a beat extracting system in accordance with one embodiment of the present invention;

FIG. 9-1 is a flowchart illustrating a process for attaching position information of each bar and beats between the specified positions Z1 and Z2;

FIG. 9-2 is a continuation of the flowchart of FIG. 9-1;

FIG. 22 is a functional block diagram diagrammatically illustrating a software module in a manual authoring section in the beat extracting system;

FIG. 24 illustrates a unit structure in accordance with which a duration manager manages a duration.

DESCRIPTION OF THE PREFERRED EMBODIMENTS

In accordance with embodiments of the present invention, beat positions are easily and accurately extracted from an audio signal (an acoustic signal). At least two delimiters (heads of bars) are specified to music data of the audio signal, and the beat positions (including the head positions of the bars) are extracted by segmenting a duration between the two specified delimiters into equal intervals. At least one delimiter specified is manually input by a listener who is actually listening to the music.

Figures 1, 9:
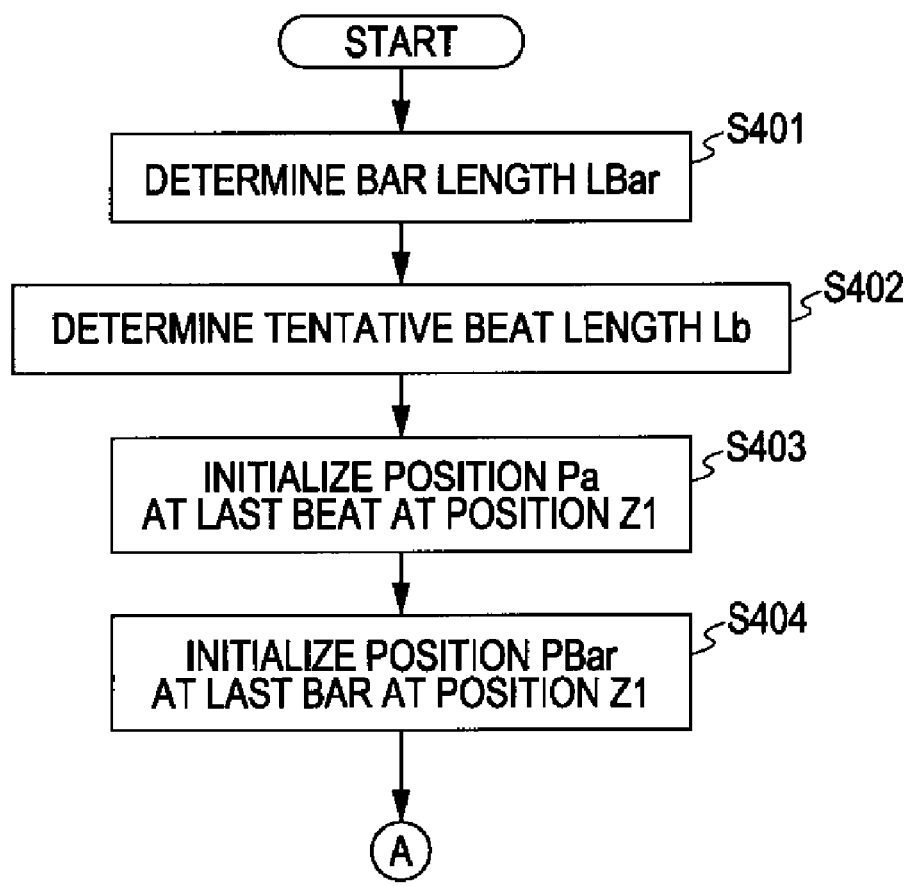
Figures 2, 9:
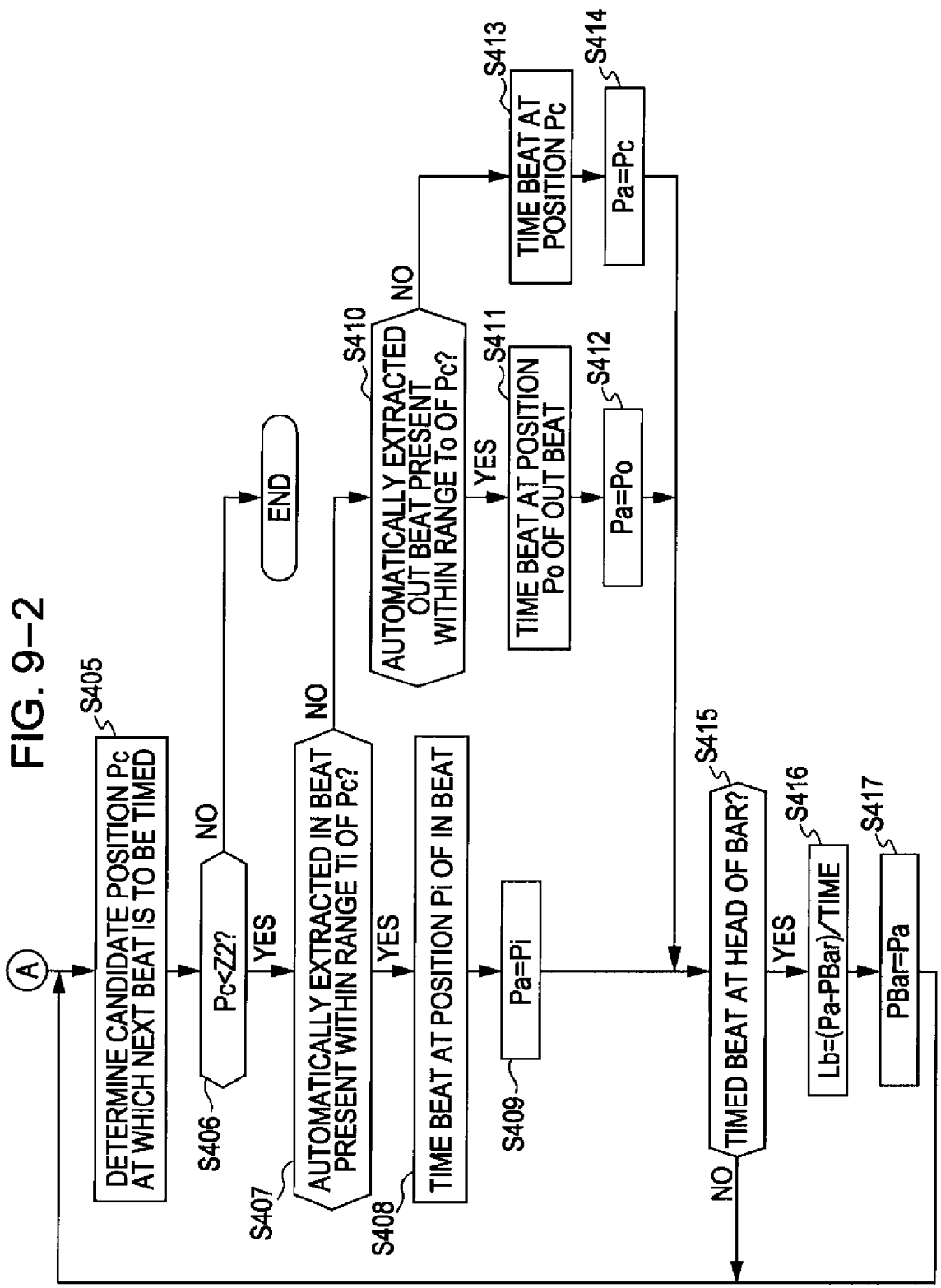

FIG. 1 illustrates a system in accordance with one embodiment of the present invention. As shown in FIG. 1, an audio signal supplier 1 supplies an audio signal including music data to a beat extracting apparatus 2. An automatic beat extractor 3 in the beat extracting apparatus 2 extracts beats. The beat automatically extracted by the automatic beat extractor 3 is supplied to a manual authoring unit 4 where a human operator manually adds time-series metadata 5 to the beat. The manual authoring unit 4 may directly perform a beat extraction process on the music data from the audio signal supplier 1 and then add time-series metadata 5.

The beat position is accurately extracted from the music data to attach accurate time-series metadata 5 onto the music data. To this end, frequency analysis or sound pressure analysis is performed by signal processing the audio signal of the music data in the known arts. If the beats of the music are clear and the beat intervals are constant, an accurate beat position can be extracted in the automatic extraction process with a high probability, and music data of the beat position is thus generated.

Figure 2:
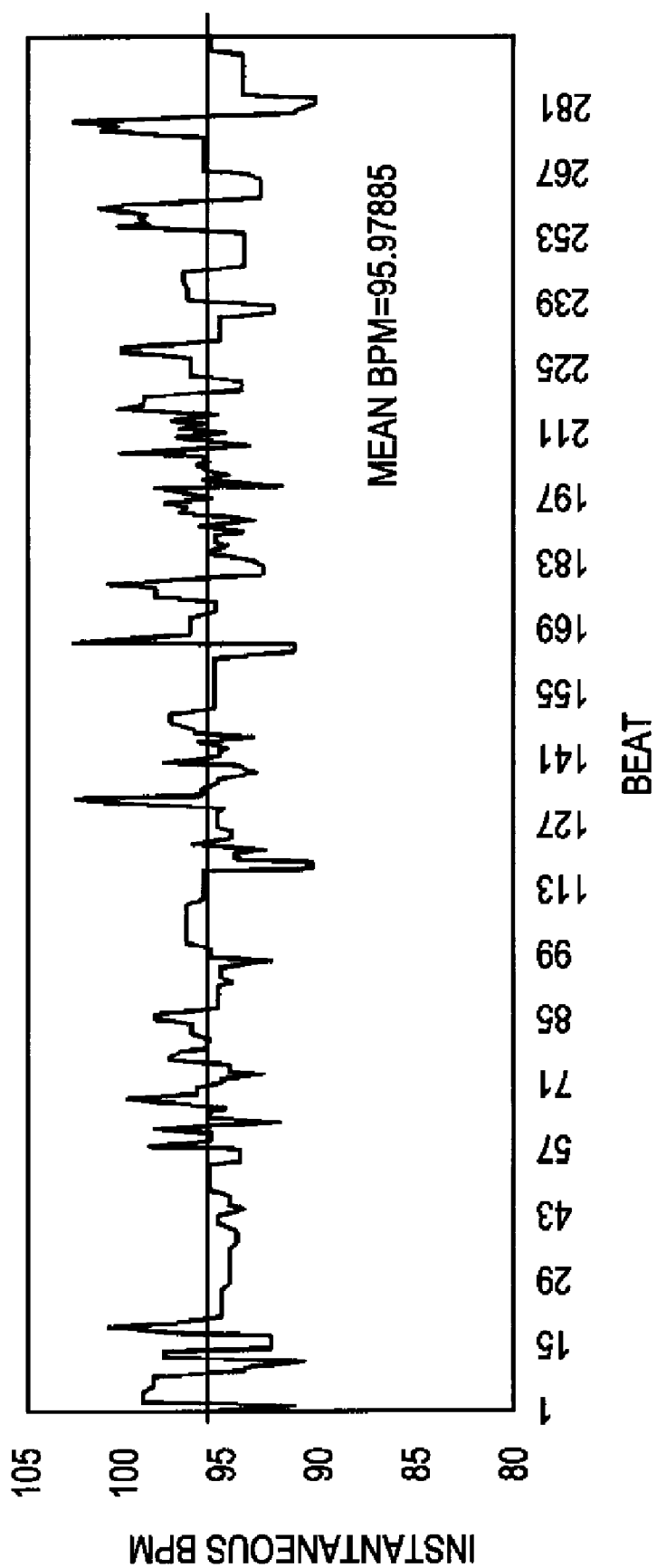
FIG. 2 is a plot of instantaneous BPM with reference to the number of beats in a song recorded.

However, if a song played by humans is recorded, the tempo of the song fluctuates as shown in FIG. 2. The beat intervals are not constant. FIG. 2 is a plot of an instantaneous beat per minute (BPM) of a song played live and recorded with respect to time (beat). Depending on songs, mean BPM gradually increases or decreases over a range of several bars rather than varying in a localized fluctuation.

In such songs, the mean BPM is not so significant with regard to representing the tempo of the song. Even if the beat positions are equally calculated using BPM, the calculated beat positions can be largely different from the actual beat positions.

If signal processing extracts accurately the beat position and fluctuations are overcome to some extent, it is still difficult to accurately extract the head portion of each bar, and the type and start position of melody.

A human can manually accurately attach time-series metadata to the music data. However, several hundred to thousand beat positions need to be attached on a per song basis. If several hundreds or thousands of songs are handled, such manual attaching operations become a vast amount of work and are not practicable.

In accordance with the system of one embodiment of the present invention, with the manual authoring unit 4, the user manually attaches data having a high degree of abstraction recognizable by humans only, based on the beat automatically extracted through the signal processing of the automatic beat extractor 3 of FIG. 1. The automatic beat extraction process performed by the automatic beat extractor 3 cannot theoretically achieve 100% accuracy level. Even if the automatic beat extractor 3 erratically detects a beat, the manual authoring unit 4 can easily correct the erratic detection. The automatic beat extractor 3 of FIG. 1 is not essential. The user can perform the beat attaching process to the music data from the audio signal supplier 1 using the manual authoring unit 4.

Figure 3:
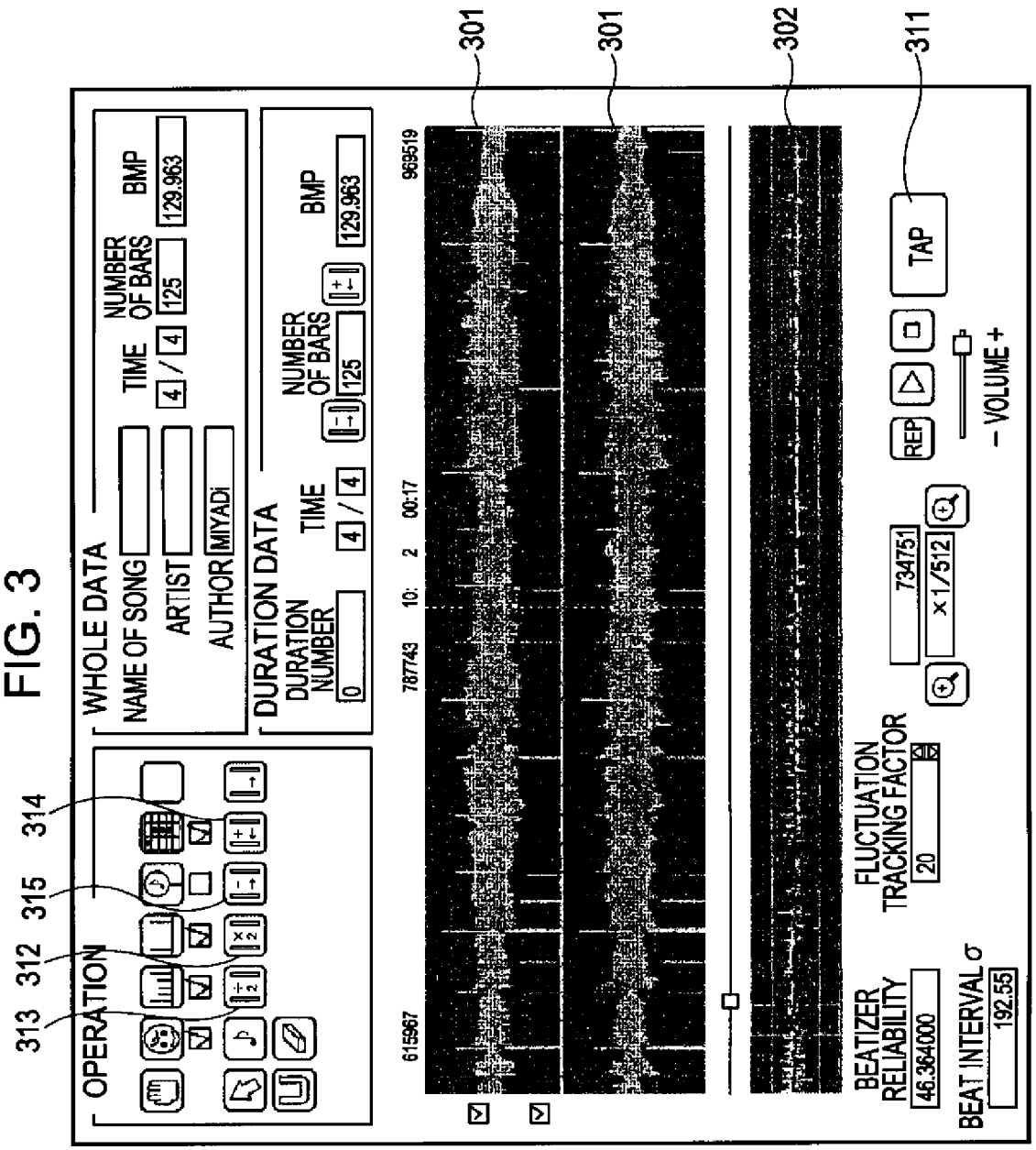
FIG. 3 illustrates an graphical operation input screen for a manual authoring process in the beat extracting system.

FIG. 3 illustrates a graphical operation input screen, namely a graphical user interface (GUI) to perform the process of the manual authoring unit 4 in the beat extraction system. As shown in FIG. 3, a waveform of the music data of the audio signal to be processed is displayed on a waveform display section 301. Also displayed on the waveform display section 301 is beat information to be discussed later. Two waveform display sections 301 illustrated in FIG. 3 are employed for stereo left and right channels, respectively. Also employed is a display section 302 for displaying the music data of the audio signal in a wide range. The display section 302 displays instantaneous BPM with respect to time axis (beat).

Figure 4:
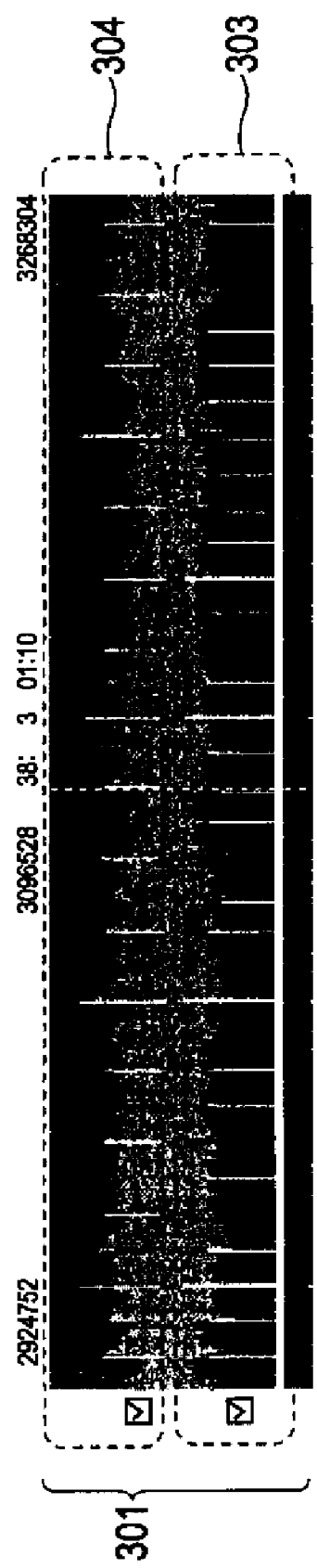
FIG. 4 illustrates beats displayed on a waveform display.

FIG. 4 illustrates a beat display mode displayed on the waveform display section 301.

The waveform display section 301 displays audio waveform data of a song. For example, the waveform display section 301 includes on an upper half thereof a beat editing area 304 for use in finalizing or editing beat information based on the pre-extracted beat. The waveform display section 301 includes on a lower half thereof a beat extracting area 303 where lines (vertical bars) indicating beat positions appears overlapping on the audio waveform, as beat information automatically extracted by the automatic beat extractor 3. The type of beat information corresponds to the function of the automatic beat extractor 3.

Figure 5:
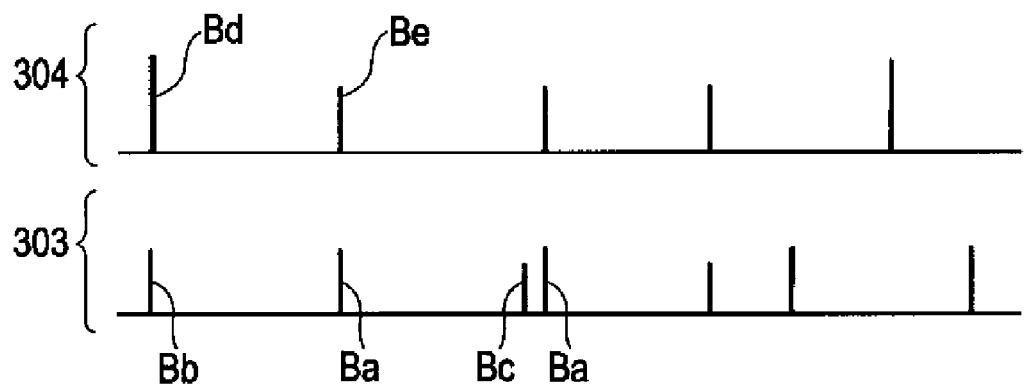
FIG. 5 illustrates only beat information extracted from a beat extraction area and displayed in a beat editing area.

FIG. 5 illustrates only the beat information displayed on the beat extracting area 303 and the beat editing area 304. As a result of the automatic beat extraction performed through the signal processing, the beat information displayed on the beat extracting area 303 of FIG. 5 includes first type beats Ba that are determined as being synchronized with each original beat, second type beats Bb that are not automatically extracted but automatically interpolated in synchronization with the original beat, and third type beats Bc that are automatically extracted but not the original beat (so-called up beat). In the discussion that follows, the first type beat Ba and the second type beat Bb are referred to as an in beat, and the third type beat Bc is referred to an out beat. These types of beats Ba-Bc are preferably shown in different colors for easy recognition. For example, the first type color Ba is shown in a light blue line, the second type color Bb is shown in a pink line, and the third type color Bc is shown in an orange line. The automatic beat extractor 3 will be described in detail later.

Based on the beats extracted and displayed on the beat extracting area 303, more accurate beat information is displayed on the beat editing area 304. The beat information displayed on the beat editing area 304 of FIG. 5 includes a head portion Bd of each bar and a normal beat Be. To determine more accurately the beat position and the position of each bar, the following problems need to be solved:

(1) The results of the automatic beat extraction process are not always 100% accurate;

(2) It is extremely difficult for the head portion of each bar and the beat to be recognized through the automatic beat extraction process, and a 100% correct answer cannot be reached.

(3) It is difficult for an apparatus to recognize an erratic extraction as an error, and a human operator needs to actually listen to the song to manually correct the error.

(4) If all process is manually performed, several hundred to several thousand beats need to be manually attached on a per song basis. Such operations are a great deal of work.

(5) The position of a manually input beat is likely to be less accurate than a position extracted through the signal processing.

(6) The beat and tempo of the song itself may greatly fluctuate.

In view of the above problems, embodiments of the present invention are developed with the following guidelines adopted:

(a) The position of the head portion of the bar can be recognized by humans only and is thus not left to automatic extraction (The music perception ability of humans is excellent).

(b) The beat position extracted through the automatic beat extraction process is used if the beat position is not erratic.

(c) If a beat is erratically extracted, the position of the erratically extracted beat is set to be easily identifiable.

(d) If a beat is erratically extracted, manual correction of the erratic beat is set to be easily performed.

The solution in accordance with the guidelines (a)-(d) are specifically described below.

The guideline (a): The position of the head portion of the bar can be recognized by humans only and is thus not left to automatic extraction is followed as below.

Each song is composed of bars, and each bar is composed of beats. In the duple time, each bar is composed of two beats, and in the quadruple time, each bar is composed of four beats.

Figure 6:
FIG. 6 illustrates points Z1 and Z2 specifying head portions of bars.

When actually listening to the music data to determine the head portion of the bar, a human operator specifies two points (Z1 and Z2) that are obviously identified as the head portion of each of the bars as shown in FIG. 6, and inputs the number of bars, n, within a duration between the two points. The beats within the duration and the bars are automatically determined (interpolated). By listening to the music data being reproduced, the operator taps a tap button 311 on the GUI screen of FIG. 3 (or clicks on a mouse) at timing the operator recognizes the head portion of each bar. The head portion of the bars is thus specified. At least two points need to be specified. Since the start position of a song is typically the head portion of a bar, the start position of the song is thus substituted for one of the two points. In such a case, only one point needs to be manually specified while listening to the song.

Figure 7:
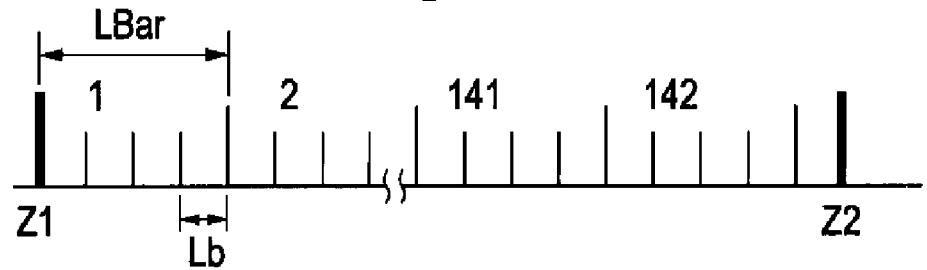
FIG. 7 illustrates how the length of each bar and beat interval are determined by inputting the number of bars between specified points Z1 and Z2.

When the two points (Z1 and Z2) as the head portions of the bars are specified, and the number of bars n is input, the length of bar LBar is represented by LBar=(Z2−Z1)/n, and the length of each beat (beat interval or beat duration) LB is presented by Lb=(LBar/number of beats). As shown in FIG. 7, for example, by inputting the number of bars n between the two specified points Z1 and Z2, n=142, the bar length LBar and beat interval Lb are determined.

Figure 8:
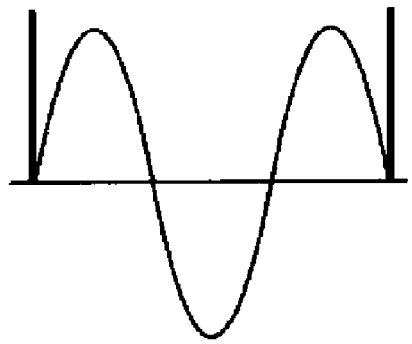
FIG. 8 illustrates the relationship between the specified points and fixed ends in vibration.

The bar length is determined from the two specified points Z1 and Z2 with the number of bars known. However, counting the number of bars is troublesome. Conversely, if the bar length LBar is known, the number of bars may be determined. A method of determining each bar and each beat position from the bar length LBar and the specified points Z1 and Z2 is described below. It should be noted that the specified points Z1 and Z2 represent the head portions of the bars and that the number of bars falling within the duration between the specified points Z1 and Z2 is an integer value. When the number of bars is determined from the bar length, an approximate length of one bar is specified, and a correct bar length closest to the number of bars n being an integer is thus determined. As shown in FIG. 8, the specified points Z1 and Z2 are considered to be fixed ends of a vibration.

The points Z1 and Z2 are specified as the head portions of the bars, and the number of bars n falling between the two points Z1 and Z2 is an integer. An approximate bar length is specified so that the number of bars automatically becomes an integer. Let La represent an approximate bar length and LBar represent a bar length that allows n bars just fit between the two points Z1 and Z2. The bar length LBar is determined from the following equation:

$$nf = ((Z2-Z1)/La) + 0.5$$

$$n = INT(nf)$$

$$LBar = (Z2-Z1)/n$$

where 0.5 is added on the left side of the equation determining nf to round off the equation determining n. INT(x) in the equation determining n is a function to round off a fractional part of x (to determine an integer).

Bars and beats are timed between the specified points Z1 and Z2 if the number of bars or the approximate length of the bar is known. Neither the number of bars nor the approximate bar length is known, a method discussed below is effective.

In the preceding method, the automatically extracted beats include in beats and out beats. The in beats are song's original beats extracted in accordance with an automatic extraction algorithm. Whether the in beat is the head portion of the bar is not known and the number of beats is not known, but the number of in beats is half or twice the actual number of beats. Taking advantage of this feature, the head portion of the bar is set based on the in beat, and the head portion of each tentative bar is regularly set for each time (such as four-four time, three-four time, etc.) specified by the user. The head portions of the tentative bars are thus arranged within the duration. The bar length LBar is easily determined by setting the number of tentative bars between the specified points Z1 and Z2 as being n or by calculating a difference between the head portions of the bars.

The automatically extracted beats may be half or twice the original time. In that case, the automatically extracted beats may be doubled or halved. By listening to the reproduced music data, the human operator can immediately recognize whether the extracted beats are half or twice the original time. In accordance with the embodiment of the present invention, an interface is provided to perform immediately recalculation by halving or doubling the number of bars n between the specified points Z1 and Z2. Buttons 312 and 313 of FIG. 3 are used to double and halve the number of bars n, respectively. When the number of bars n is determined, the recalculation of the beat positions is easily performed. An accurate number of bars and an accurate bar length are thus easily determined with a few operation steps.

In accordance with one embodiment of the present invention, an interface to allow the user to manually increment or decrement the number of bars n by +1 or −1 (with buttons 314 and 315 as shown in FIG. 3) respectively is provided. If the time length between the specified points Z1 and Z2 is long, an error involved increases. The number of bars n determined from the length La can be larger or smaller than the actual number by 1 or so. If the beat rises when the user listens to the reproduced music data, the number of bars n may be incremented by 1 or decremented by 1, and the bar length LBar will be automatically recalculated to reposition the beat. This operation is performed based on the premise that the number of bars n between the specified points Z1 and Z2 is an integer value.

The guideline (b): The beat position extracted through the automatic beat extraction process is used if the beat position is not erratic. This guideline is followed as described below.

The head positions, the number, and the lengths of the bars are determined in order to interpolate the bars and beats between the specified points Z1 and Z2. If the bars and the beats are interpolated equally, the actual beat position and the calculated beat position become shifted from each other with respect to a song that may suffer from beat interval fluctuation shown in FIG. 2.

In accordance with one embodiment of the present invention, that inconvenience is overcome by accounting for the beat information automatically extracted through the signal processing. More specifically, the beat position information obtained through the automatic beat extraction process of the automatic beat extractor 3 of FIG. 1 accounts for the beat fluctuation, and is thus used intact as much as is possible. If there is a possibility that the automatically extracted beat is in error, the beat position information at that position is not used but the calculated position information is used. With reference to FIGS. 9-1 and 9-2, that process is described below.

FIGS. 9-1 and 9-2 are flowcharts illustrating a process of attaching the position information of bar and beat successively from the point Z1 specified at the head portion of the bar by the human operator toward the specified point Z2.

In step S401 of FIG. 9-1, the bar length LBar is determined. As previously described, the bar length LBar is determined from the following equation using the positions of the specified points Z1 and Z2 and the number of bars n:

$$LBar = (Z2-Z1)/n$$

where the number of bars n is determined from the above-described approximate length La.

In step S402, the tentative beat length Lb is determined from the following equation, i.e., by dividing the bar length LBar determined in step S401 by the time:

$$Lb = LBar/time$$

In step S403, a variable Pa indicating the position of the beat timed last during this process (the position of the beat recently attached) is initialized by substituting the specified point Z1 as an initial value for the variable Pa (Pa=Z1). In step S404, a variable PBar indicating the position of the head portion of the bar timed last (the position of the head portion of the bar recently attached) is initialized by substituting the position of the specified point Z1 for the variable PBar (PBar=Z1).

In step S405, the value of Pa+Lb is substituted for a variable Pc indicating the position of a next beat candidate (Pc=Pa+Pa). A position advancing from the last (latest) beat position Pa by the tentative beat length Lb is set to be a position Pc as a next beat candidate. Whether an automatically extracted beat is present within a range of a threshold value Ti (within a window width) centered on the candidate position Pc. It is then determined in step S406 whether the candidate position Pc is smaller than the specified point Z2 (Pc<Z2). If the determination in step S406 is yes, in other words, if the candidate position Pc is ahead of the specified point Z2 in time, processing proceeds to step S407. If the determination in step S406 is no, processing ends.

It is determined in step S407 whether an automatically extracted in beat is present within the range of the threshold value Ti centered on the candidate position Pc. If the determination in step S407 is yes, processing proceeds to step S408. In step S408, the beat information is attached at the position Pi of the in beat. In step S409, Pa indicating the latest position where the beat has been timed is updated for later process by substituting Pi for the variable Pa. Processing proceeds to step S415.

If it is determined in step S407 that no automatically extracted in beat is found, processing proceeds to step S410. If it is determined in step S410 whether an automatically extracted out beat is present within a range of a threshold value To centered on the candidate position Pc (namely, within a window width, Ti>To in this embodiment). If the determination in step S410 is yes (with an out beat present) the beat information is attached at the position Po of the output beat in step S411. In step S412, the variable Pa indicating the latest position where the beat has been timed is updated for later process by substituting Po (Pa=Po). Processing proceeds to step S415.

If the determination in step S410 is no (with no automatically extracted out beat), processing proceeds to step S413. The beat information is attached at the position of the position candidate Pc. In step S414, the variable Pa indicating the latest position where the beat has been timed is updated for later process by substituting Pc for Pa (Pa=Pc). Processing proceeds to step S415.

It is determined in step S415 whether the finally timed beat (the beat at the position of the variable Pa indicating the latest position) is the head portion of a bar. If the determination in step S415 is yes, processing proceeds to step S416. If the determination in step S415 is no, processing returns to step S405.

In step S416, the length of the nearest bar is determined by calculating Pa–PBar based on the beat position Pa timed last and the position PBar of the head portion of the bar timed last. The beat length candidate Lb is then determined from the determined bar length and the time. More specifically, $$Lb=(Pa-PBar)/time$$

In step S417, the variable PBar indicating the latest position of the head portion of the bar is updated by substituting Pa for PBar (PBar=Pa). Processing returns to step S405.

Steps S405 through S417 are repeated until the determination in step S406 becomes no, namely, until the candidate position Pc reaches the specified point Z2.

Figure 10:
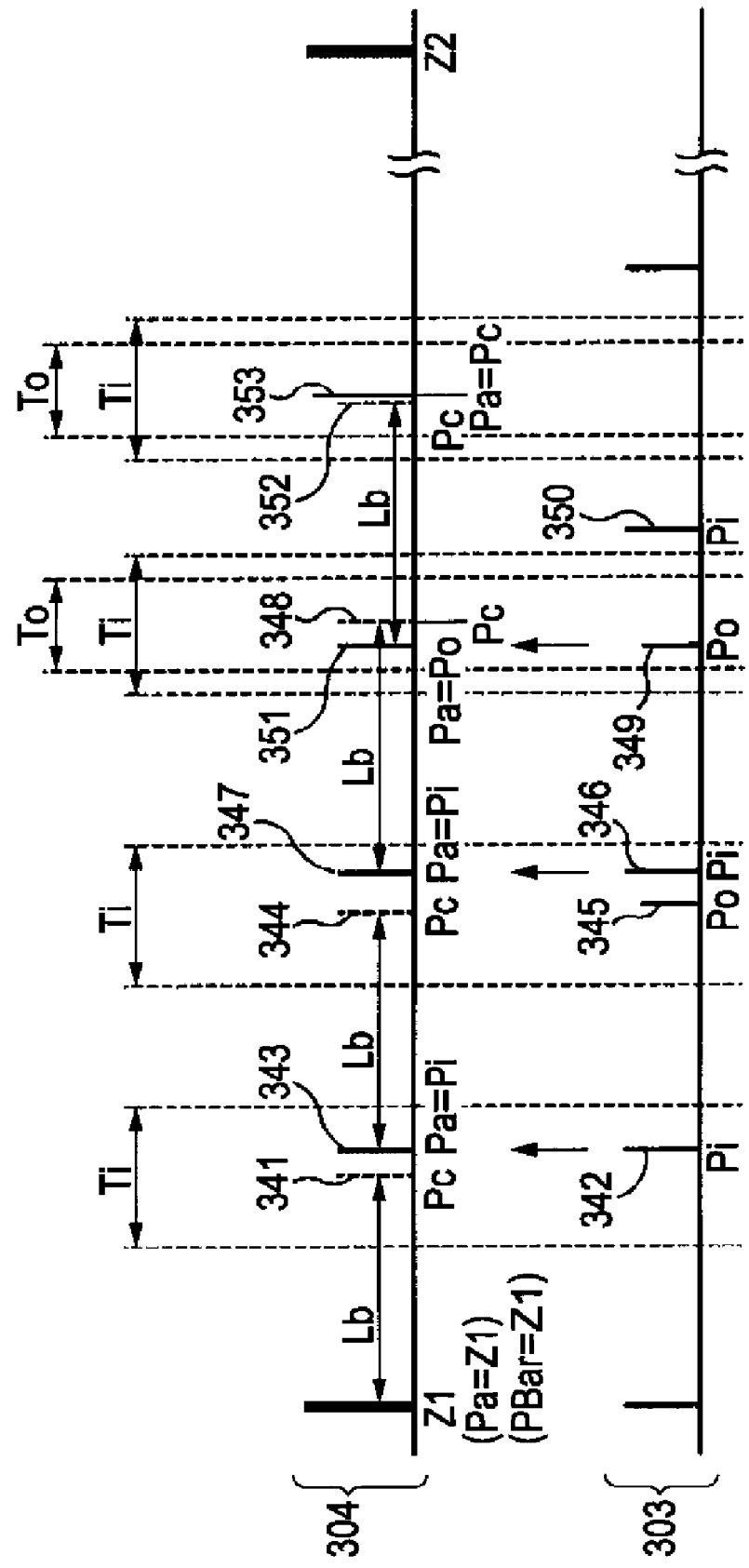
FIG. 10 illustrates how each beat and the head of each bar are timed between the specified points Z1 and Z2.

FIG. 10 illustrates how the head portions of each beat and each bar are timed, thereby illustrating the beat extracting area 303 displaying the automatically extracted beats, and the beat editing area 304 where the head portions of the beats and the bars are timed in response to the extracted beats. The waveform of the music data is not shown in FIGS. 5 and 10. The first type color Ba discussed with reference to FIG. 5 corresponds to the beat at the position Pi of FIG. 10 as the automatically extracted in beat. The second type color Bb corresponds to the beat at the position Po of FIG. 10 as the automatically extracted out beat.

With reference to FIG. 10, the specified point Z1 is the initial value of the last (latest) beat position Pa and the bar head portion position PBar as described in steps S403 and S404 of FIG. 9-1. The sum of the last (latest) beat position Pa (=Z1) and the tentative beat length Lb are determined as the position Pc of a next beat candidate 341. It is then determined whether an automatically extracted beat is present within the range of the threshold value Ti (within the window width) centered on the candidate position Pc.

With reference to FIG. 10, an in beat 342 automatically extracted from within the range of the threshold range Ti centered on the position Pc of the beat candidate 341 is present in the beat extracting area 303. The determination in step S407 of FIG. 9-2 is yes, and processing proceeds to step S408. A beat 343 is thus timed in the beat editing area 304 at the position Pi of the extracted beat 342. In step S409, the variable Pa indicating the last (latest) beat position is updated by substituting the position Pi of the beat 343 for the variable Pa (Pa=Pi).

A position advancing by the tentative beat length Lb from the updated Pa is set to be a position Pc of a next beat candidate 344. When an automatically extracted beat is examined from within the rate of the threshold value Ti centered on the position Pc, an output beat 345 and an in beat 346 are present in the beat extracting area 303 of FIG. 10. As understood from the flowchart of FIG. 9-1, if the determination in step S407 as to whether an in beat is present is yes, processing proceeds to step S408. A beat 347 is timed in the beat editing area 304 at the position Pi of the in beat 346 within the range of the threshold value Ti. The variable Pa is updated with the position Pi (Pa=Pi).

An automatically extracted beat is examined from within the range of the threshold Ti centered on the beat candidate 348 at a position advancing by the tentative beat length Lb from the position Pa of the last (latest) timed beat 347. An out beat 349 is present but no in beat is present in the beat extracting area 303 of FIG. 10. For example, a next in beat 250 is out of the range of the threshold value Ti. The determination in step S407 of FIG. 9-2 is no, and processing proceeds to step S410. It is determined in step S410 whether an automatically extracted output beat is present within the range of the threshold value To centered on the position Pc of the beat candidate 348 (Ti>To in this embodiment). Since the output beat 349 in the beat extracting area 303 of FIG. 10 falls within the range of the threshold value To, the determination in step S410 is yes. Processing proceeds to step S411. A beat 351 is timed in the beat editing area 304 at the position Po of the output beat 349. In step S412, the variable P1 is updated by substituting the position Po for the variable Pa (Pa=Po).

No in beat is present within the range of the threshold value Ti centered on the position Pc of a beat candidate 352 at a position advancing by the tentative beat length Lb from the position Pa of the beat 351. No out beat is present either within the range of the threshold value To centered on the position Pc. The determination in step S407 of FIG. 9-2 is no, the determination in step S410 is no, and processing proceeds to step S413. A beat 353 for interpolation is timed at the position Pc of the beat candidate 352.

The automatically extracted beat present within the range of a predetermined threshold value with respect to the candidate position Pc of a next beat is used as is (drawn to the position of the automatically extracted beat). If there is no automatically extracted beat within the range of the predetermined threshold value, an interpolating beat is timed at the candidate position Pc of the next beat.

The guideline (c): If a beat is erratically extracted, the position of the erratically extracted beat is set to be easily identifiable is followed as described below.

In the beat editing area 304 of FIG. 10, a beat may be timed between the specified points Z1 and Z2. The beats 343, 347, 351, 353, etc. may be displayed in different colors in the beat editing area 304 depending on whether the automatically extracted beat displayed in the beat extracting area 303 is found within the window width, namely within the range of the threshold value Ti or To centered on the beat candidate position Pc.

In accordance with one embodiment of the present invention, the beats 343, 347, etc drawn to the in beat position Pi of the automatically extracted beats are displayed in light blue (or blue), the beat 351, etc. drawn to the output beat position Po of the automatically extracted beat is displayed in yellow (or orange), and the beat 353, etc. interpolated through calculation because of no automatically extracted beat found within the predetermined threshold range is displayed in red (or pink). By analogy with traffic lights, the beats are displayed in light blue (blue), orange, and red in the high to low reliability order.

In this way, if the automatically extracted beat position and the bar position and the beat attaching position within the duration between the specified points Z1 and Z2 fall within the range of the threshold value Ti in the vicinity of the candidate position, the beat is displayed in light blue (blue).

If an erratic extraction takes place during the automatic extraction process, the extracted beat position and the beat attaching position within the duration between the specified points Z1 and Z2 deviates from each other. In most of the cases where the beat is not correctly extracted, the tempo may greatly change over several to tens of bars in a song, or an accurate in beat cannot be picked up in a song that is not distinct in beating. In such a case, the number of beats falling within the duration between the specified points Z1 and Z2 cannot be divided by the number of the bars. Since the specified points Z1 and Z2 are the head portions of the bars, the number of beats falling within the duration must be an integer multiple of the number bars. However, if an erratic extraction takes place, the number of beats falling within the duration fails to match the actual number of beats. Any beat fails to fall within the range of the threshold value Ti or To of FIG. 10. This state continues until a beat shifted by one beat falls within the threshold. As a result, the red beats are consecutively displayed in the beat editing area 304. Beat shifting can thus be easily found.

Figure 11A:
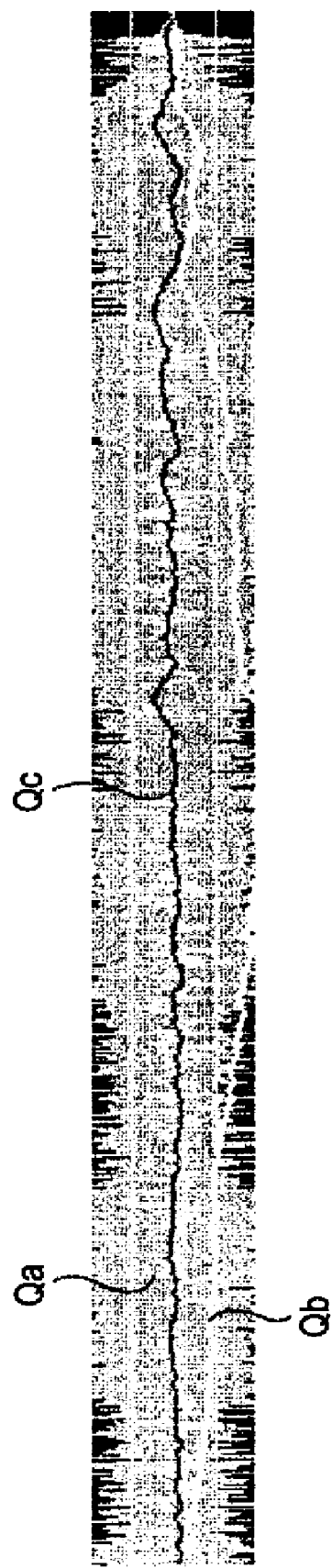
FIGS. 11A and 11B are plots of error, accumulated error, and phase shift in instantaneous BPM of beats displayed on a display unit.
Figure 11B:
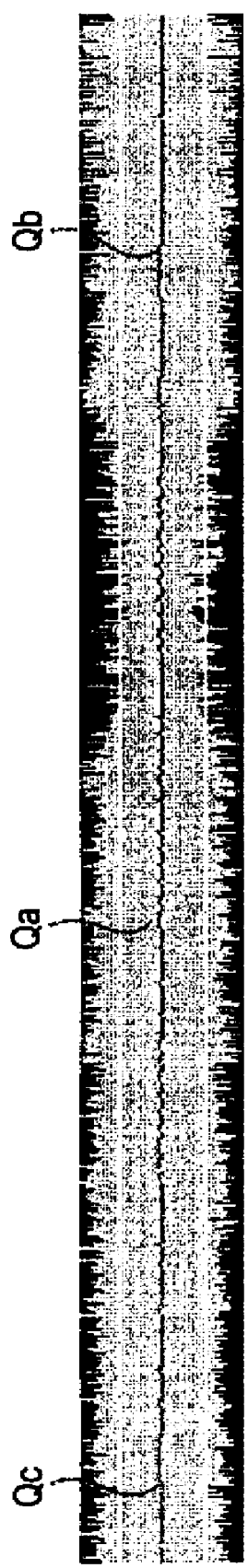

An error, an accumulated error and a phase shift of each beat in the instantaneous BPM are visualized in graph. The reliability of each beat automatically extracted through the signal processing is thus predicted. FIG. 11A illustrates in the display section 302 a sound performed live or recorded where the beats fluctuate greatly. FIG. 11B illustrates in the display section 302 a sound reproduced on a computer. As shown in FIGS. 11A and 11B, a curve Qa represents the error in the instantaneous BPM of beats, a curve Qb represents an accumulated error in the instantaneous BPM of beats, and a curve Qc represents a phase shift.

If the automatic extraction works with the BPM of the song stabilized as shown in FIG. 11B, the three curves Qa, Qb, and Qc generally overlap. If the beats greatly fluctuate as shown in FIG. 11A, the curves Qa, Qb, and Qc shift from each other. In this way, the reliability of the automatically extracted beats is recognized at a glance.

The guideline (d): If a beat is erratically extracted, manual correction of the erratic beat is set to be easily performed, is followed as described below.

As previously described, the cause for an erratic extraction is that the tempo may greatly change over several to tens of bars in a song, or that an accurate in beat cannot be picked up in a song that is not distinct in beating. In addition, a composer or a player may intentionally partially change the time.

Figure 12:
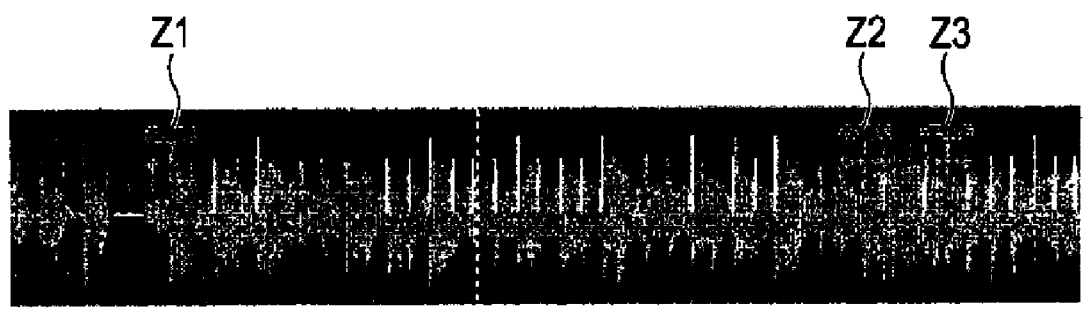
FIG. 12 illustrates a waveform in which at least three specified points are input.

If the beat cannot be extracted from the song, an erratic extraction is easily detected in the methods discussed with reference to FIGS. 10 and 11A and 11B. Preferably, at least two durations are set up in such a song, and accurate beat positions and accurate head portion positions of the bars are determined. With reference to FIG. 12, at least three points Z1, Z2, and Z3 are specified, and the processes discussed with reference to FIGS. 9-1, 9-2 and 10 are performed for each duration between the specified points Z1, Z2, and Z3.

The specified points Z1, Z2, . . . are at the head portions of the bars, the length of the bar, the number of bars, and the beats from each of the specified points Z1, Z2, . . . to a next specified point are individually managed. The durations are divided into ones where the automatic extraction has been successful and ones where the automatic extraction has been unsuccessful, and the above-described calculation is performed for each duration with bar length different from duration to duration.

Figure 13:
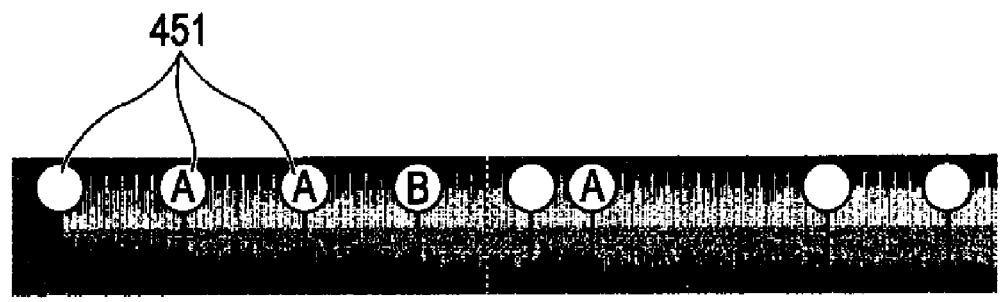
FIG. 13 illustrates a waveform in which a melody structure of a song is input as time-series metadata.

Separately from duration setting, the manual authoring unit 4 of FIG. 1 can input, as the time-series music data, music structure information regarding a melody structure of a song, including an intro, melody A, melody B, climax, and an ending of the song. More specifically, as shown in FIG. 13, marks 451 indicating position information of change for identifying each portion of the melody structure are attached and displayed in response to a user operation input, together with the beat position and the bar head portion position of the music data in the waveform display section 301. The change position responsive to the melody structure is different from the specified points Z1, Z2, . . . , but is at the head portion positions of the bars in many cases. The tempo and the time may be changed in the melody structure from duration to duration. For example, the intro may be played at a tempo slower than a tempo in the other portion.

In accordance with embodiments of the present invention, the time-series metadata for an application that requires accurate beat position of a song can be easily and accurately attached. Information such as an accurate melody, accurate code progression, lyric, etc. may be attached in accordance with the beat position.

A music remixing application requiring accurate metadata, and a device and a software program requiring accurate timing control in synchronization with the beat can be manufactured.

The music metadata extraction system is described below. The music metadata extraction system includes the beat extracting apparatus 2 having the manual authoring unit 4 of FIG. 1. The manual authoring unit 4 manually attaches the beat position and the bar head portion position. The music metadata extraction system also includes the automatic beat extractor 3.

Figure 14:
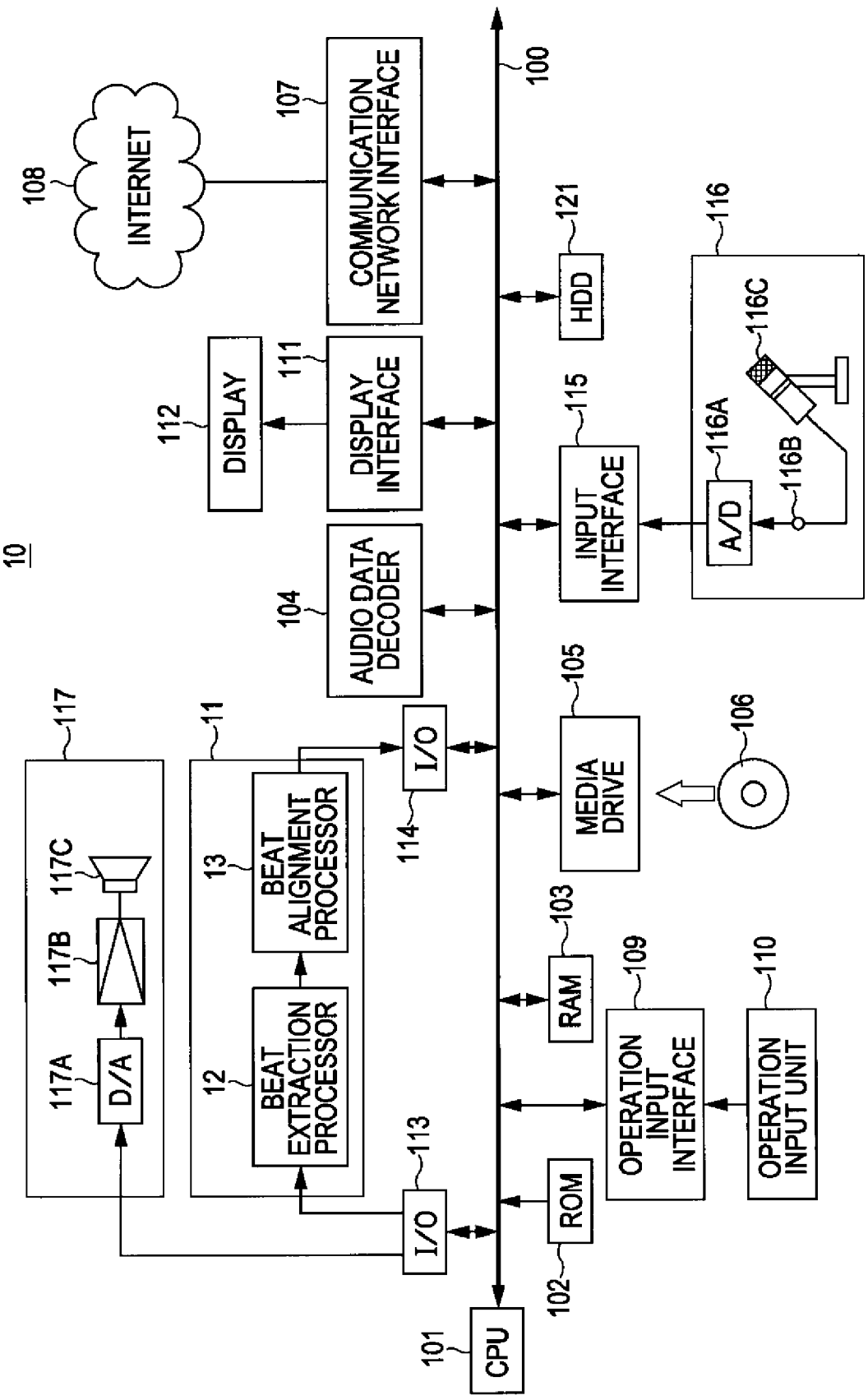
FIG. 14 is a block diagram illustrating a music reproducing apparatus incorporating a beat extractor in accordance with one embodiment of the present invention.

FIG. 14 is a block diagram illustrating a hardware structure including the beat extracting apparatus 2 of FIG. 1 in accordance with one embodiment of the present invention. An apparatus 10 of FIG. 14, including a personal computer, performs not only the functions of the automatic beat extractor 3 and the manual authoring unit 4 of FIG. 1 but also performs a music content delivery function and a music reproducing function.

The automatic beat extractor 3 obtains an automatically extracted beat serving as raw data (input data) to the manual authoring unit 4 of FIG. 1. The automatic beat extractor 3 is not an essential element in the present invention. The higher the beat extraction accuracy in the automatic beat extractor 3, the more the time for the manual authoring is saved. The beat extraction and the bar head portion extraction are performed at a high quality level. The use of a high-quality automatic beat extractor 3 is still useful. From this point of view, a preferable example of the automatic beat extractor 3 of FIG. 1 is described in detail.

In the apparatus 10 of FIG. 14, a central processing unit (CPU) 101, a read-only memory (ROM) 102 and a random-access memory (RAM) 103 are connected to a system bus 100. The ROM 102 stores a variety of programs, and the CPU 101 performs processes on the RAM 103 as a working area in accordance with the programs.

Also connected to the system bus 100 are an audio data decoder 104, a media drive 105, a communication network interface (I/F) 107, an operation input interface 109, a display interface 111, an input-output (I/O) port 113, an input-output (I/O) port 114, an input interface 115, and a hard disk drive (HDD) 121. A series of data units to be processed by elements is supplied to respective elements via the system bus 100.

The media drive 105 reads music data of music content recorded on a disk 106, such as a compact disk (CD) or a digital versatile disk (DVD), into the system bus 100.

An operation input unit 110 such as a keyboard and a mouse is connected to the operation input interface 109.

As previously discussed with reference to FIG. 3, the display 112 displays a GUI screen during a manual authoring operation. During the automatic beat extraction, the display 112 can display data in synchronization with the extracted beat or a doll or a robot dancing to the extracted beat.

The I/O port 113 connects to an audio reproducing section 117 and a beat extractor 11. The I/O port 114 connects to the beat extractor 11. The beat extractor 11 corresponds to the automatic beat extractor 3 of FIG. 1.

The input interface 115 connects to an input unit 116 including an analog-to-digital (A/D) converter 116A, a microphone terminal 116B, and a microphone 116C. An audio signal and a music signal picked up by the microphone 116C are converted into a digital audio signal by the A/D converter 116A. The digital audio signal is then supplied to the input interface 115. The input interface 115 acquires the digital audio signal into the system bus 100. The digital audio signal (time-series waveform signal) captured by the system bus 100 is recorded in a format .wav on the HDD 121. The digital audio signal captured via the input interface 115 is not directly supplied to the audio reproducing section 117.

Upon receiving music data from one of the HDD 121 and the media drive 105 via the system bus 100, an audio data decoder 104 decodes the music data to restore the digital audio signal. The audio data decoder 104 then supplies the restored digital audio signal to the I/O port 113 via the system bus 100. The I/O port 113 supplies the signal audio signal transferred via the system bus 100 to each of the beat extractor 11 and the audio reproducing section 117.

The system bus 100 acquired data from a medium 106 such as a known CD via the media drive 105. Uncompressed audio content downloaded by a listener and stored on the HDD 121 is directly captured by the system bus 100. On the other hand, compressed audio content is returned to the system bus 100 via the audio data decoder 104. The digital audio data is captured by the system bus 100 via the input unit 116 and the input interface 115 (the digital audio signal is not limited to a music signal and may include a voice signal, and other audio band signal) and then stored on the HDD 121. The digital audio data is then returned to the system bus 100.

In the apparatus 10 in accordance with one embodiment of the present invention, the digital audio signal (corresponding to the time-series waveform signal), captured by the system bus 100, is transferred to the I/O port 113 and then to the beat extractor 11.

The beat extractor 11 in accordance with one embodiment of the present invention includes a beat extraction processor 12 and a beat alignment processor 13. The beat extraction processor 12 extracts beat position information of a rhythm of a song. The beat alignment processor 13 generates beat period information using the beat position information extracted by the beat extraction processor 12, and aligns the beats of the beat position information extracted by the beat extraction processor 12 in accordance with the beat period information.

Figure 15:
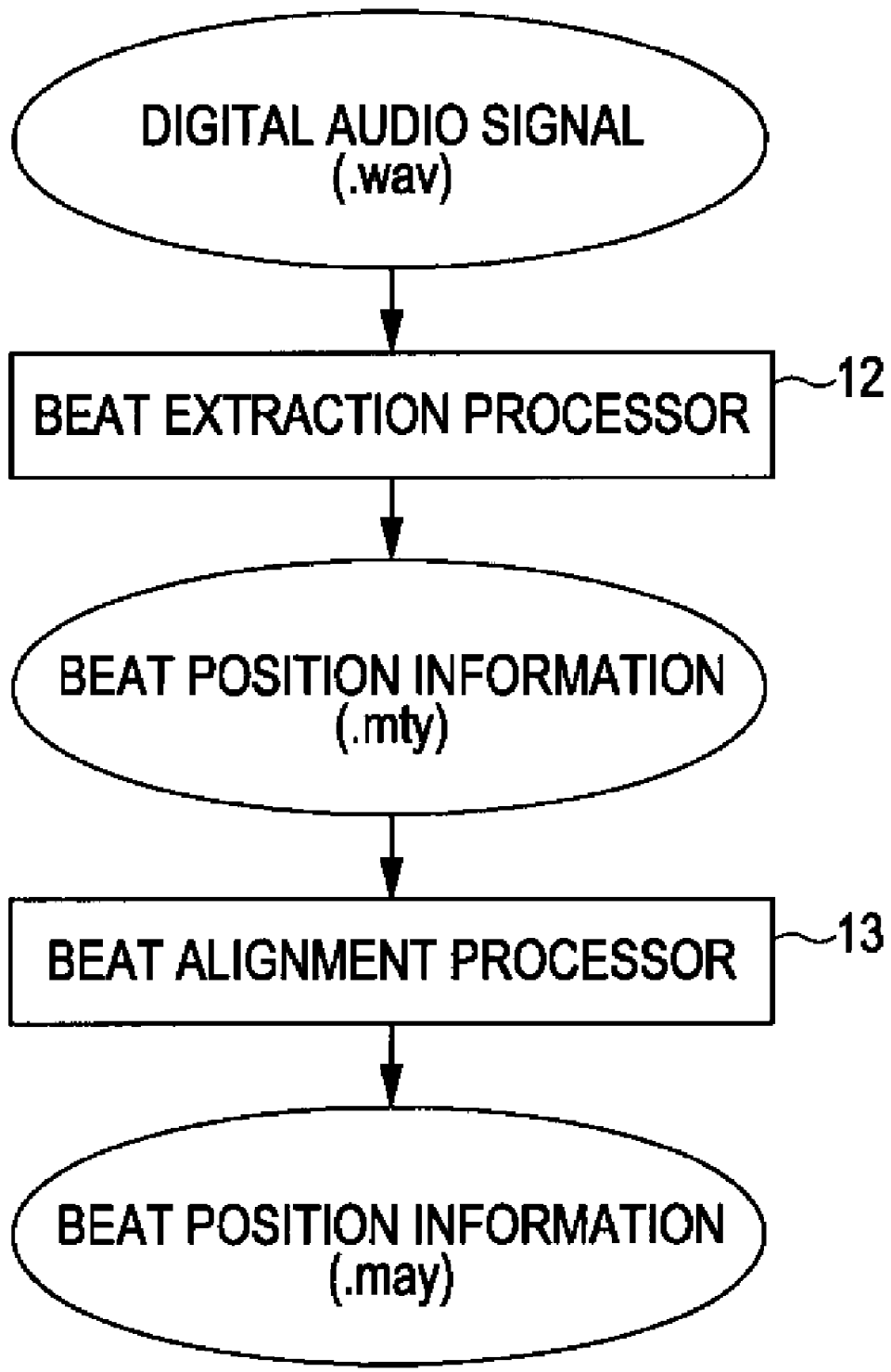
FIG. 15 is a functional block diagram illustrating the beat extractor.

Upon receiving the digital audio signal recorded in a .wav file as shown in FIG. 15, the beat extraction processor 12 extracts coarse beat information from the digital audio signal and outputs the resulting coarse beat information as music data recorded in a .mty file. Based on all music data recorded in the .mty file and music data corresponding to a music portion assumed to have the same tempo, the beat alignment processor 13 aligns the beat position information extracted by the beat extraction processor 12, and outputs the resulting beat position information as music data recorded in a .may file. Extracted beat position information having stepwise increased high accuracy is thus provided. The beat extractor 11 will be described in detail later.

The audio reproducing section 117 includes a digital-to-analog (D/A) converter 117A, an output amplifier 117B, and a loudspeaker 117C. The I/O port 113 supplies the digital audio signal transferred via the system bus 100 to the D/A converter 117A in the audio reproducing section 117. The D/A converter 117A converts the digital audio signal supplied via the I/O port 113 into an analog audio signal, and the analog audio signal is supplied to the loudspeaker 117C via the output amplifier 117B. The loudspeaker 117C converts into a sound the analog audio signal supplied from the D/A converter 117A via the output amplifier 117B.

The display interface 111 connects to a display 112, such as a liquid-crystal display (LCD). The display 112 displays a beat component and a tempo value extracted from the music data of the music content. The display 112 displays an animation screen or lyric to the music.

The communication network interface 107 connects to the Internet 108. The music reproducing apparatus 10 accesses a server storing attribute information of the music content via the Internet 108, thereby transmitting identification information of music content with acquisition request for attribute information as a key word. The music reproducing apparatus 10 causes a hard disk on the HDD 121 to store the attribute information transmitted from the server in response to the acquisition request.

The beat extractor 11 in the music reproducing apparatus 10 in accordance with one embodiment of the present invention extracts the beat position information of a rhythm of a song based on the feature of the digital audio signal to be discussed below.

Figures 16A, 16B:
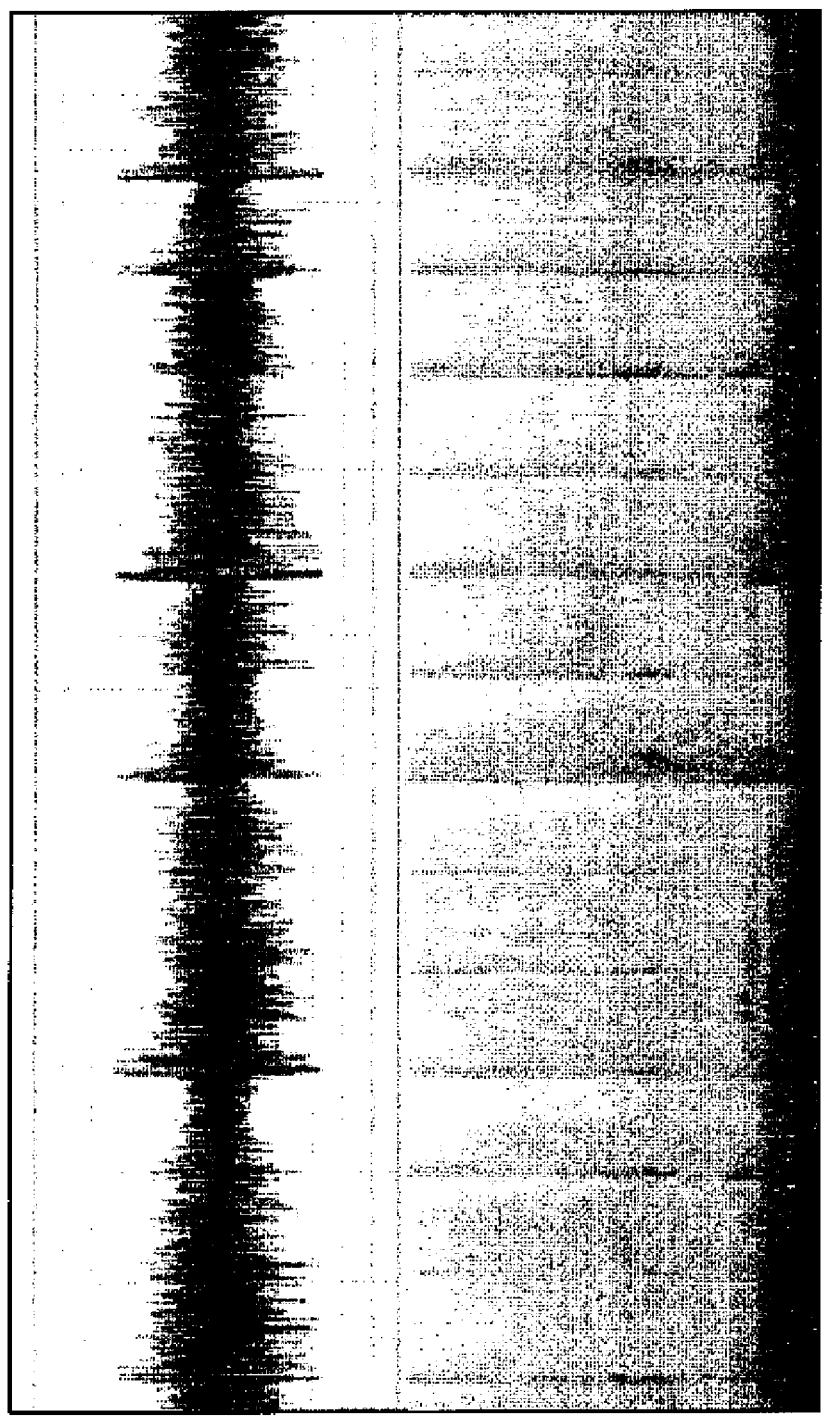
FIG. 16A illustrates a time-series waveform of a digital audio signal and FIG. 16B illustrates a spectrogram of the digital audio signal.

FIG. 16A illustrates a time-series waveform of the digital audio signal. The time-series waveform of FIG. 16A includes portions indicating an instantaneous large peak. The portion indicating a large peak may correspond to a beat of a drum.

Actually listening to the song having the time-series waveform of the digital audio signal shown in FIG. 16A reveals that more beats are timed at generally regular intervals, although such beats are invisibly hidden in the time-series waveform of the digital audio data. The actual beat components of the rhythm of the song cannot be extracted from the large peak values of the time-series waveform alone shown in FIG. 16A.

FIG. 16B illustrates a spectrogram of the digital audio signal having the time-series waveform of FIG. 16A. In the spectrogram of the digital audio signal of FIG. 16B, beat components hidden in the time-series waveform of FIG. 16A emerge as portions instantaneously greatly changing in power spectrum. Actual listening to the song reveals that the portions instantaneously greatly changing in power spectrum correspond to the beat components. The beat extractor 11 regards the portions instantaneously greatly changing in power spectrum as the beat components of the rhythm.

The rhythm period and beats per minute (BPM) of the song can be known by extracting the beat component and measuring the beat period.

Figure 17:
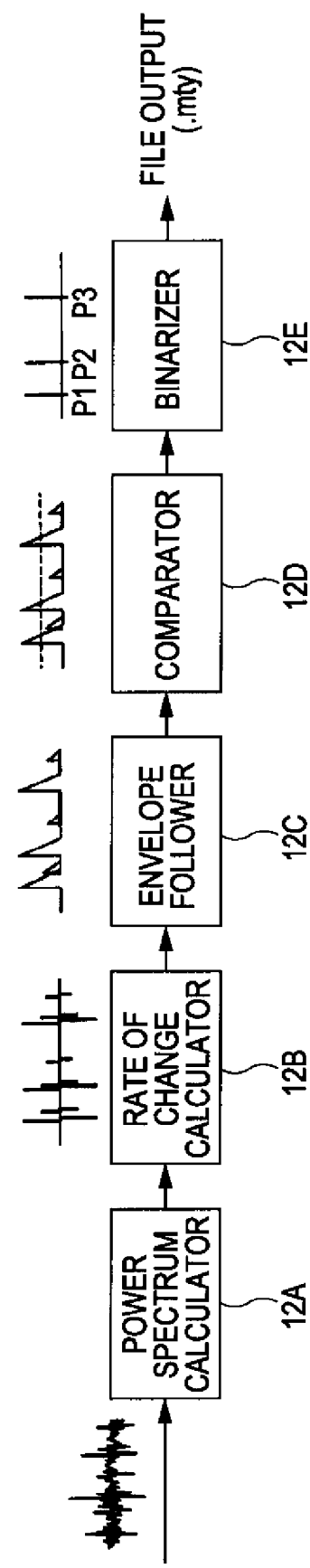
FIG. 17 is a functional block diagram illustrating a beat extraction processor.

As shown in FIG. 17, the beat extraction processor 12 includes a power spectrum calculator 12A, a rate of change calculator 12B, an envelope follower 12C, a comparator 12D, and a binarizer 12E.

Figures 18A, 18B, 18C:
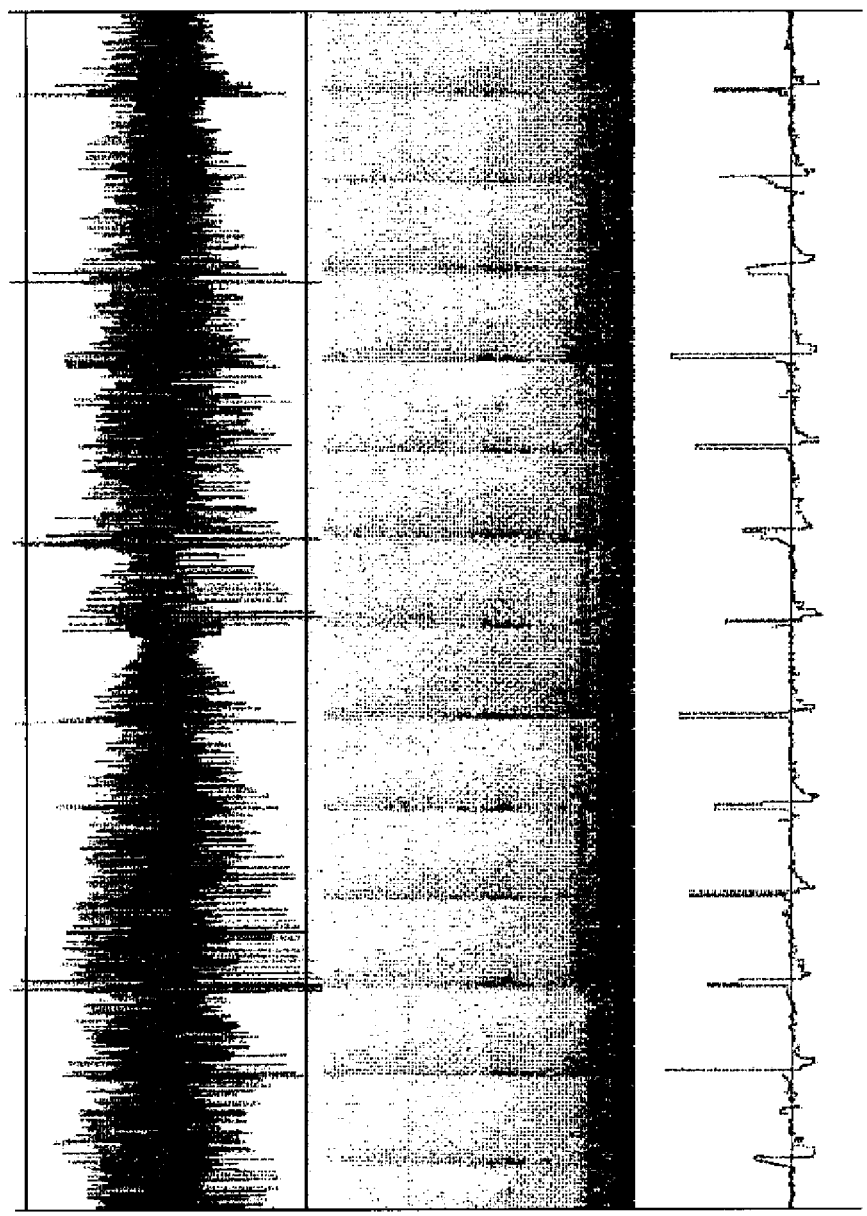
FIG. 18A illustrates a time-series waveform of a digital audio signal.
FIG. 18B illustrates a spectrum gram of the digital audio signal.
FIG. 18C illustrates a beat waveform extracted from the digital audio signal.

The power spectrum calculator 12A receives the digital audio signal made of a time-series waveform of a song shown in FIG. 18A.

The digital audio signal supplied from the audio data decoder 104 is supplied to the power spectrum calculator 12A in the beat extraction processor 12.

The power spectrum calculator 12A cannot extract the beat component from the time-series waveform at a high accuracy level. The power spectrum calculator 12A performs a fast Fourier transfer (FFT) process on the time-series waveform, thereby calculating a spectrogram of FIG. 18B.

The definition in the FFT process is preferably set to be 5 to 30 ms in real time with a sample count being 512 or 1024 if a sampling frequency of the digital audio signal input to the beat extraction processor 12 is 48 kHz. Parameter values set in the FFT process is not limited to the ones set herein. The FFT process is preferably performed while window function such as hanning window or hamming window is applied with the window overlapped.

The power spectrum calculator 12A supplies the calculated spectrum to the rate of change calculator 12B.

The rate of change calculator 12B calculates a rate of change of the power spectrum supplied from the power spectrum calculator 12A. More specifically, the rate of change calculator 12B differentiates the power spectrum supplied from the power spectrum calculator 12A, thereby calculating a rate of change. By repeatedly differentiating the constantly varying power spectrum, the rate of change calculator 12B outputs a detected signal having a extracted beat waveform of FIG. 18C. The positively transitioned peaks of the extracted beat waveforms of FIG. 18C are regarded as the beat component.

Upon receiving the detected signal from the rate of change calculator 12B, the envelope follower 12C imparts a hysteresis characteristic having an appropriate time constant to the detected signal. The envelope follower 12C thus removes chattering from the detected signal, and then supplies the chattering free detected signal to the comparator 12D.

The comparator 12D sets an appropriate threshold level, and eliminates a low-level noise component from the detected signal supplied from the envelope follower 12C, and then supplies the low-level noise free detected signal to the binarizer 12E.

The binarizer 12E binarizes the detected signal supplied from the comparator 12D to leave the detected signal having a level equal to or higher than the threshold level. The binarizer 12E outputs beat position information, indicating position of beat components of P1, P2, and P3 in time and recorded in a .mty file, as the music data.

The beat extraction processor 12 extracts the beat position information from the time-series waveform of the digital audio signal, and then outputs the beat position information in the .mty file as the music data. The elements in the beat extraction processor 12 includes internal parameters set. By changing the internal parameters, the effect of operations of each element is modified. The internal parameters are automatically optimized. But the user can manually override the parameter setting using the operation input unit 110.

Figure 19A:
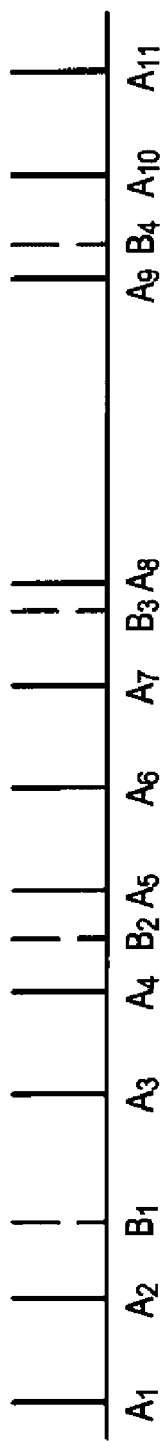
FIG. 19A illustrates a beat interval of beat position information extracted by the beat extraction processor.

The beat intervals of the beat position information of the song, extracted and recorded in the .mty file by the beat extraction processor 12 as the music data, are typically regular as shown in FIG. 19A.

The beat alignment processor 13 aligns beat position information in a music portion providing the same song or the same tempo, out of the beat position information extracted by the beat extraction processor 12.

The beat alignment processor 13 extracts regularly timed beats, such as A1 through A11 of FIG. 19A, timed at regular time intervals, from the metadata of the beat position information extracted and recorded in the .mty file by the beat extraction processor 12. The beat alignment processor 13 does not extract irregularly timed beats, such as B1 through B4. In accordance with one embodiment of the present invention, the regularly timed beats are timed at regular intervals, such as those of quarter notes.

The beat alignment processor 13 calculates accurate mean period T from the metadata of the beat position information extracted and recorded in the .mty file by the beat extraction processor 12, and extracts, as regular interval beats, beats having a time interval equal to the mean period T.

Figure 19B:
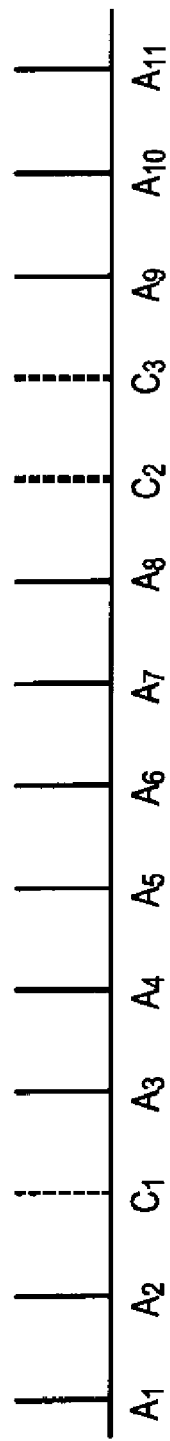
FIG. 19B illustrates a beat interval of beat position information aligned by a beat alignment processor.

The extracted regularly timed beats alone causes a blank period as shown in FIG. 19A. As shown in FIG. 19B, the beat alignment processor 13 adds interpolation beats C1 through C3 at positions where otherwise the regular beats would be timed. The beat position information relating to all beats timed at regular intervals is thus obtained.

The beat alignment processor 13 defines in beats as beats that are in equal phase with the regular interval beats, and extracts the in beats. The in beats are those synchronized with actual music beats, and include the regular interval beats. The beat alignment processor 13 defines out beats as beats that are out of phase with the regular interval beats, and excludes the out beats. The out beats are those that are not synchronized with the actual music beats (such as quarter note beats). The beat alignment processor 13 needs to discriminate between the in beats and the out beats.

Figure 20:
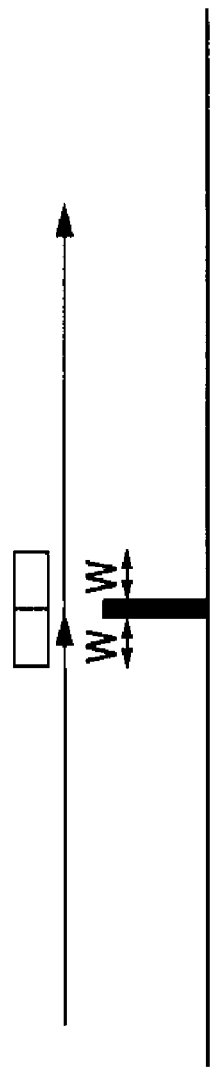
FIG. 20 illustrates a window width for determining whether a particular beat is an in beat.

To discriminate between the in beat and the out beat, the beat alignment processor 13 defines a constant window width W centered on the regular interval beat as shown in FIG. 20. The beat alignment processor 13 determines that a beat contained within the window width W is an in beat, and that a beat not contained within the window width W is an out beat.

When no regular interval beat is not contained in the window width W, the beat alignment processor 13 adds an interpolation beat to interpolate between the regular interval beats.

Figure 21:
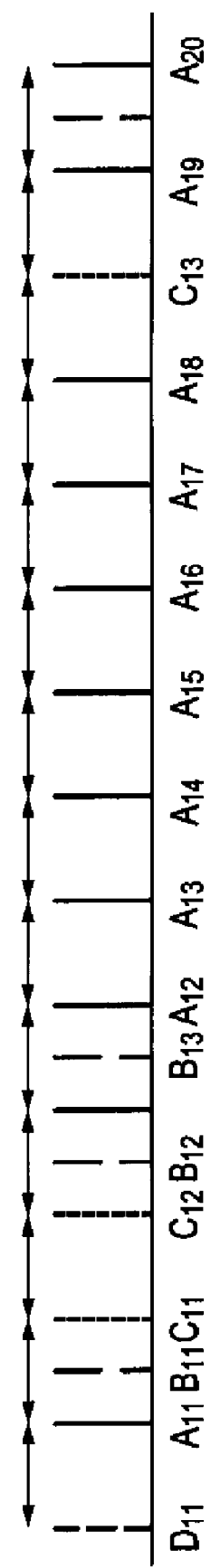
FIG. 21 illustrates a beat interval of the beat position information.

As shown in FIG. 21, the beat alignment processor 13 extracts regular interval beats A11 through A20, and an in beat D11 substantially in phase with the regular interval beat A11. The beat alignment processor 13 also extracts interpolation beats C11 through C13. The beat alignment processor 13 does not extract out beats B11 through B13 as quarter note beats.

Since music beats fluctuate in time, the number of in beats extracted from a song suffering a large fluctuation is decreased. An extraction error, called beat slip, may be caused.

The value of the window width W is set to be large in a song suffering from a large fluctuation. The number of in beats extracted is thus increased, and the extraction error is reduced. The window width W may be normally constant. In a song suffering from a large fluctuation, the window width W as a parameter may be adjusted to be larger.

The beat alignment processor 13 imparts, to the metadata, beat attribute indicating the in beat contained in the window width W and the out beat not contained in the window width W. If no extracted beat is present within the window width W, the beat alignment processor 13 automatically adds an interpolation beat, and gives beat attribute as the interpolation beat as the metadata. The metadata forming the beat information includes the above-described beat position information and the beat attribute, and records the metadata in a metadata file (.may). The elements contained in the beat alignment processor 13 have internal parameters such as the window width W, and the effect of the operation of the beat alignment processor 13 is modified by modifying the internal parameters.

The beat extractor 11 automatically extracts highly accurate beat information from the digital audio signal by performing two-step data processing with the beat extraction processor 12 and the beat alignment processor 13. The beat extractor 11 performs not only the in beat/out beat determination process but also the beat interpolation process, thereby resulting in the beat information of quarter note intervals over an entire song.

The beat extractor 11 discussed as a specific example of the manual authoring unit 4 of FIG. 1 can musically synchronize a pulse-code modulated (PCM) audio waveform (sampling source) having no timestamp information such as the beat position information with another medium. The data size of the time stamp information such as the beat position information ranges from several Kbytes to tens of Kbytes, and is extremely small, as small as one-thousandth the data size of the audio waveform. Memory capacity and operation steps may be reduced, thereby permitting the user to easily handle the beat position information. Even if a song suffers from tempo change or rhythm fluctuation, beats can be accurately extracted from the entire song. By synchronizing the music with another medium, a new entertainment may be created.

The beat information extracted by the beat extractor 11 is transferred to the manual authoring unit 4 of FIG. 1 to obtain the metadata of highly accurate beat position and bar head.

With the hardware structure of FIG. 14, the manual authoring unit 4 of FIG. 1 performs the previously described manual authoring functions using software.

FIG. 22 is a functional block diagram illustrating software modules of the manual authoring unit 4 in the beat extraction system of FIG. 1.

As shown in FIG. 22, an operating system 200 inputs data to and outputs data from a keyboard 110A, a mouse 110B, a display 112, a loudspeaker 117C, and a storage device 201, each used as the operation input unit 110 of FIG. 14. The storage device 201 stores acoustic data 202 containing the music data and metadata 203, and includes the HDD 121 of FIG. 14, for example.

Software modules implemented on the operating system 200 includes a user input processor 205, a metadata manager 206, a display manager 207, an automatic beat detector 208, a file input-output unit 209, an acoustic data manager 210, and an acoustic reproducing unit 211.

The user input processor 205 determines a user operation input entered via the input device such as the keyboard 110A and the mouse 110B, and issues process commands to modules responsive to the user operation input. When the user selects a duration mark input operation using the mouse 110B, the user input processor 205 sets itself to a duration mark input state, and notifies the display manager 207 that the user input processor 205 is in the duration mark input state.

When the user then clicks on the mouse 110B within an input enabled area, the user input processor 205 converts clicked coordinates into a position of the acoustic data in time axis and instructs the metadata manager 206 to place a duration mark at the position in time axis.

Figure 23A:
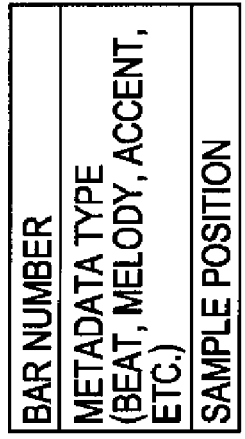
FIGS. 23A and 23B illustrate a structure and list of metadata bodies.
Figure 23B:
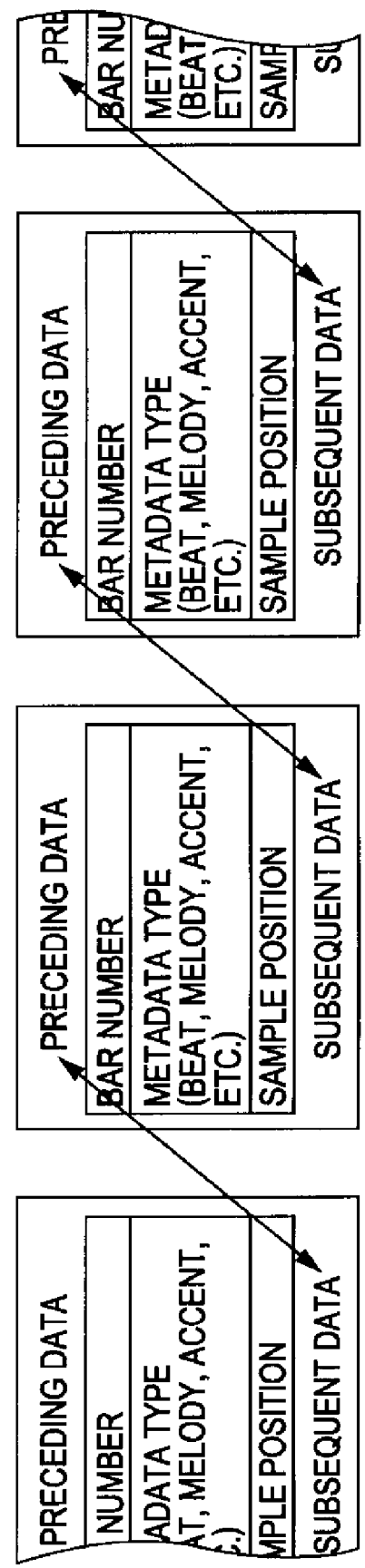

The metadata manager 206 includes a duration manager 221 and metadata body 222. The metadata body 222 includes lists of data trains as shown in FIG. 23B. Each data train has a structure shown in FIG. 23A. The data train of FIG. 23A includes bar number, metadata type including beat, melody, and accent, and sample position. The metadata is chronologically managed. The metadata body 222 is managed in a list structure. When new data to be inserted in editing operation is created, a reference destination pointer and a reference source pointer are simply changed.

The duration manager 221 manages durations. The duration manager 221 stores a structure of FIG. 24 as a unit. As shown in FIG. 24, the one unit includes a start sample, an end sample, a duration BPM, a beat in duration, the number of bars in duration, and a duration bar length.

The metadata manager 206 generates a duration based on duration information informed of by the user input processor 205, and determines the beat position, based the bar position informed of by the user input processor 205, in accordance with the process discussed with reference to FIGS. 9-1 and 9-2. The beat position calculation is performed on a per duration basis.

The metadata manager 206 deletes, moves, inserts, and searches for the metadata body 222 and the duration data.

The display manager 207, including an acoustic data display 225 and a metadata display 226, calculates a range of time axis currently displayed on the screen of the display 112, and searches for the metadata contained in the range using the metadata manager 206. The display manager 207 displays the metadata in a color or an icon responsive to the type of acquired metadata on the screen of the display 112.

The display manager 207 further displays the waveform of the acoustic data, statistical data, the bar number, and a numerical value of a sample position of a sample currently being edited.

The automatic beat detector 208 corresponds to one of the automatic beat extractor 3 of FIG. 1 and the beat extractor 11 of FIG. 14. The automatic beat detector 208 automatically extracts the music beat from the music data, and notifies the metadata manager 206 of the position of each automatically extracted beat. An automatic beat extraction algorithm may be used as long as the algorithm generates information satisfying the requirement of information to be supplied to the metadata manager 206.

The file input-output unit 209 opens specified acoustic data, reads data of samples of the number specified by a specified position, and returns the data to a request source. The file input-output unit 209 outputs the metadata body to a file on a secondary storage such as the storage device 201, and reads the data from the metadata file on the secondary storage into the metadata body 222.

The acoustic data manager 210 stores the acoustic data read via the file input-output unit 209, and transfers the acoustic data to each of the acoustic reproducing unit 211 and the display manager 207. The storage device 201 searches for and stores a variety of information incident to the acoustic data (such as a quantization bit number, a sampling rate, the number of channels, etc.).

The acoustic reproducing unit 211 reproduces the acoustic data from a specified point, and outputs the acoustic data to an actual acoustic output device such as the loudspeaker 117C.

What is claimed is:

1. A method for attaching metadata to music data stored in electronic memory using a processor to attach the metadata to the music data, the method comprising:
    specifying two positions in head portions of bars of music data of music;
    segmenting into segments a duration extending between the specified two positions and attaching time-series metadata to the segments using the processor;
    automatically extracting beats from the music data by using a signal processing device to automatically detect beats and by using the processor to extract the automatically detected beats;
    plotting an error, an accumulated error and a phase shift for each beat of the extracted beats on a graph corresponding to an average beat rate of the extracted beats by using the processor to compare the error, the accumulated error and the phase shift for each beat to the average beat rate; and
    displaying the graph on a display device.

2. The method according to claim 1, wherein at least one of the two positions in the head portions of the bars is manually specified by a listener who is listening to the music.

3. The method according to claim 1, wherein the time-series metadata is calculated by dividing the duration extending between the two specified positions by one of the length of the bar and the number of bars.

4. The method according to claim 3, wherein the bar length is determined by setting a tentative bar length and calculating the bar length closest to the tentative bar length so that the number of bar lengths within the duration between the two specified positions is an integer value.

5. The method according to claim 1, wherein the time-series metadata is obtained by calculating the number of bars within the duration with the head portion specified with respect to the automatically extracted beats.

6. The method according to claim 5, further comprising searching for an automatically extracted beat contained within a range of a predetermined threshold in the vicinity of a candidate beat position, and using a beat position of the extracted beat with priority.

7. The method according to claim 6, further comprising determining a reliability value of the calculated beat by searching again for the automatically extracted beat with the range of the threshold value stepwise changed.

8. The method according to claim 7, wherein the reliability value is lowered by interpolating a beat based on the calculated if no automatically extracted beat is detected within the range of the threshold value.

9. The method according to claim 8, wherein the color of each beat displayed on the display device is changed in response to the reliability value of the beat.

10. The method according to claim 4, wherein a beat interval of next beats is dynamically timed based on the immediately preceding bar length calculated.

11. An apparatus for attaching metadata, comprising:
means for inputting at least two positions in head portions of bars of music data of music;
means for segmenting into segments a duration extending between the specified two positions and attaching time-series metadata to the segments;
means for automatically extracting beats by performing a signal process on the music data;
means for plotting an error, an accumulated error and a phase shift for each beat of the extracted beats on a graph using an average beat rate of the extracted beats; and
a display configured to display the graph.

12. The apparatus according to claim 11, wherein at least one of the two positions in the head portions of the bars is manually specified by a listener who is listening to the music.

13. An apparatus for attaching metadata, comprising:
a unit inputting at least two positions in head portions of bars of music data of music;
a unit segmenting into segments a duration extending between the specified two positions and attaching time-series metadata to the segments;
a unit automatically extracting beats by performing a signal process on the music data;
a unit plotting an error, an accumulated error and a phase shift for each beat of the extracted beats on a graph using an average beat rate of the extracted beats: and a unit displaying the graph on a display device.

* * * * *